(12) United States Patent
Prevost

(10) Patent No.: US 7,273,642 B2
(45) Date of Patent: Sep. 25, 2007

(54) MODULAR SYNTHETIC GRASS TURF ASSEMBLY

(75) Inventor: Jean Prevost, Quebec (CA)

(73) Assignee: Fieldturf Tarkett Inc. (CA)

( * ) Notice: Subject to any disclaimer, the term of this patent is extended or adjusted under 35 U.S.C. 154(b) by 328 days.

(21) Appl. No.: 10/453,525

(22) Filed: Jun. 4, 2003

(65) Prior Publication Data

US 2004/0058096 A1    Mar. 25, 2004

Related U.S. Application Data

(63) Continuation-in-part of application No. 09/944,167, filed on Sep. 4, 2001, now abandoned.

(51) Int. Cl.
A63B 69/36 (2006.01)

(52) U.S. Cl. ..................................... 428/17

(58) Field of Classification Search ............... 428/17, 428/95, 85
See application file for complete search history.

(56) References Cited

U.S. PATENT DOCUMENTS

| 3,735,988 A | | 5/1973 | Palmer et al. | |
| 4,436,779 A | * | 3/1984 | Menconi et al. | 428/169 |
| 4,497,853 A | * | 2/1985 | Tomarin | 428/17 |
| 4,902,540 A | | 2/1990 | Martino | |
| 5,187,894 A | | 2/1993 | Ripley, Sr. et al. | |
| 5,309,846 A | * | 5/1994 | Peterson | 108/53.3 |
| 5,595,021 A | | 1/1997 | Ripley, Sr. et al. | |
| 5,976,645 A | * | 11/1999 | Daluise et al. | 428/17 |
| 6,263,616 B1 | * | 7/2001 | Hummer | 47/65.9 |
| 2002/0029515 A1 | | 3/2002 | Prévost | |
| 2004/0058096 A1 | | 3/2004 | Prévost | |
| 2004/0081771 A1 | | 4/2004 | Waterford | |

FOREIGN PATENT DOCUMENTS

JP    2002-354937    12/2002

* cited by examiner

Primary Examiner—John J. Zimmerman
Assistant Examiner—Daniel Miller
(74) Attorney, Agent, or Firm—Factor & Lake

(57) ABSTRACT

A modular synthetic grass turf assembly includes a plurality of synthetic grass units which are transportable, adapted to be laid flat on a field and fit side by side to provide a flat and continuous synthetic grass surface for activities. Each unit includes a flexible base sheet preferably with drainage grooves and bores if it is for outdoor use. A synthetic grass turf with an infill layer of particulate materials disposed interstitially between synthetic grass fibers is superposed on the base sheet to provide a grass surface with a required quality, and be fixed thereto or simply retained in place by the weight of the infill. A number of units may have irregular shapes or can be painted with different colors to illustrate letters, marks or logos. The modular synthetic grass turf assembly is conveniently transported from a storage facility to a site.

25 Claims, 15 Drawing Sheets

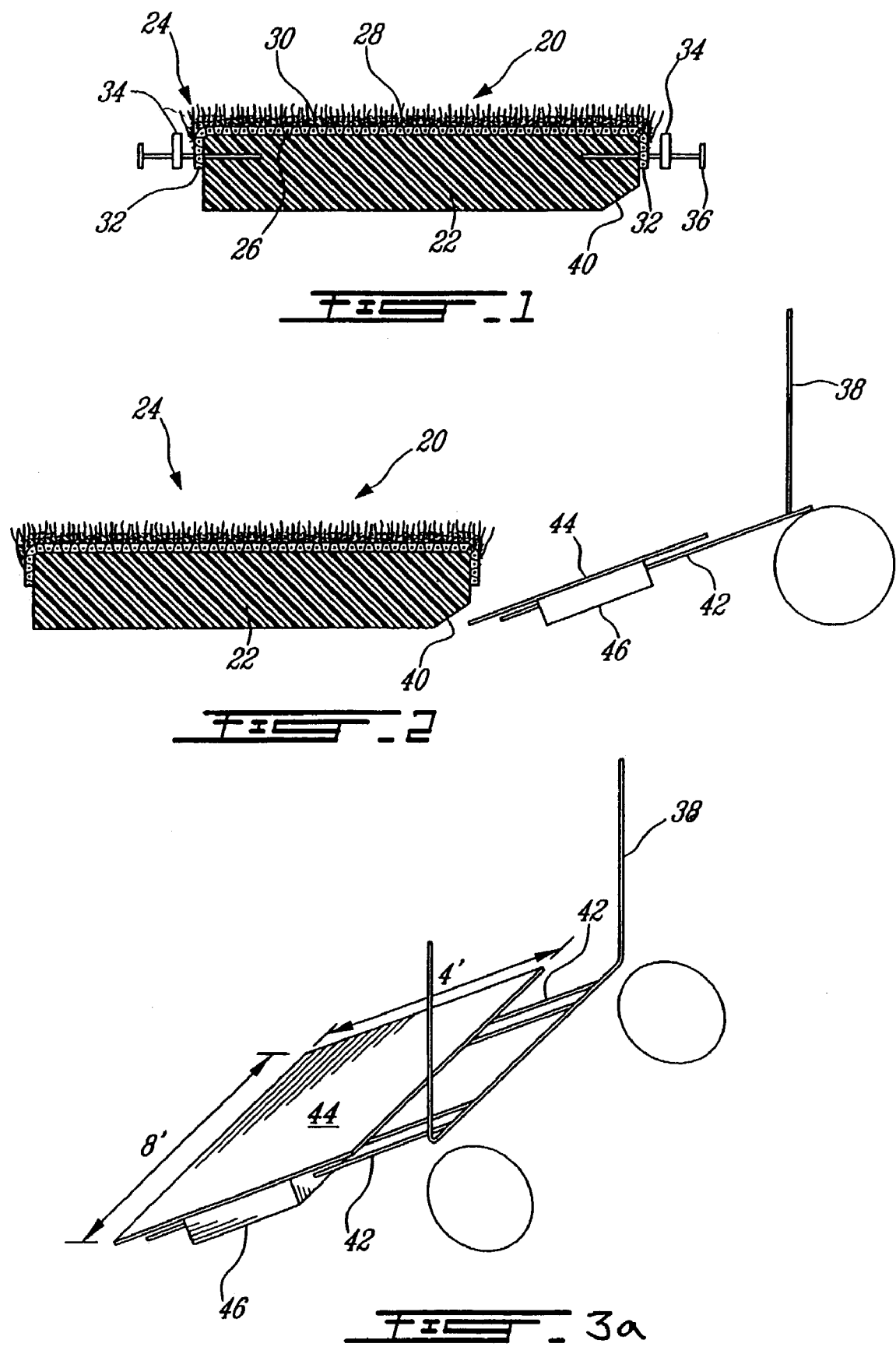

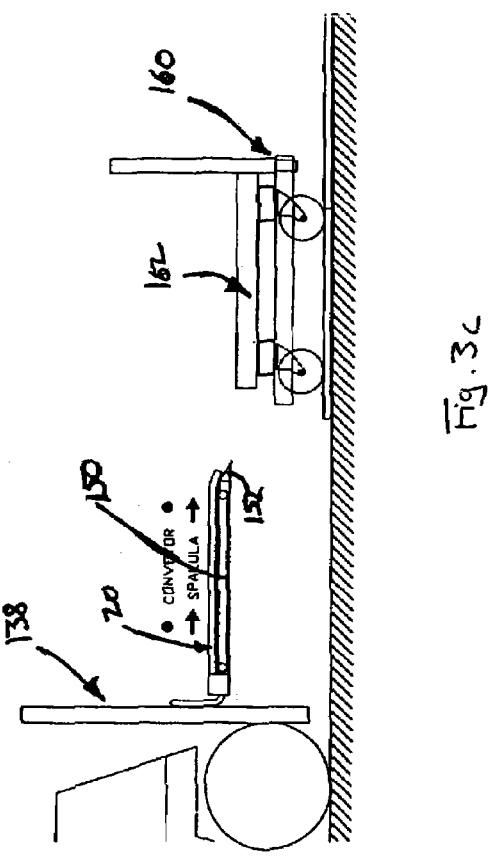
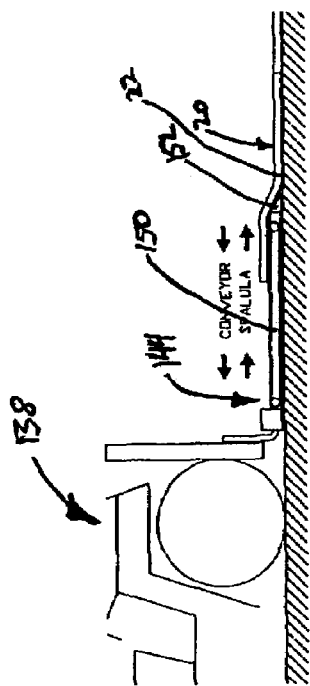
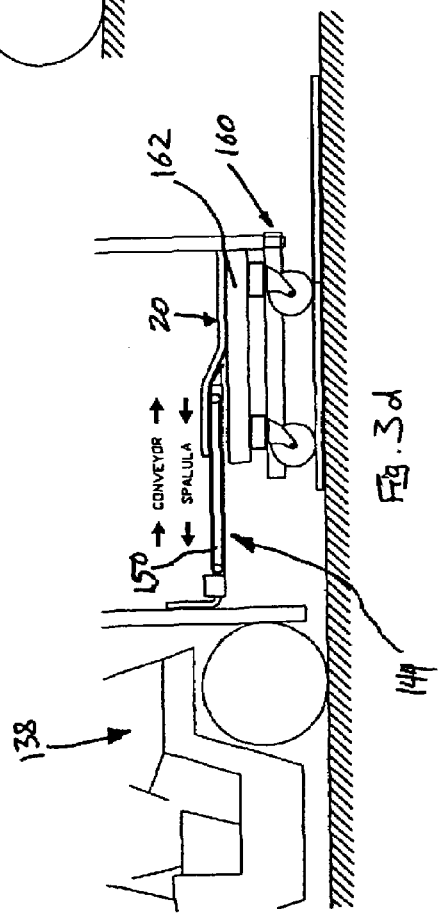

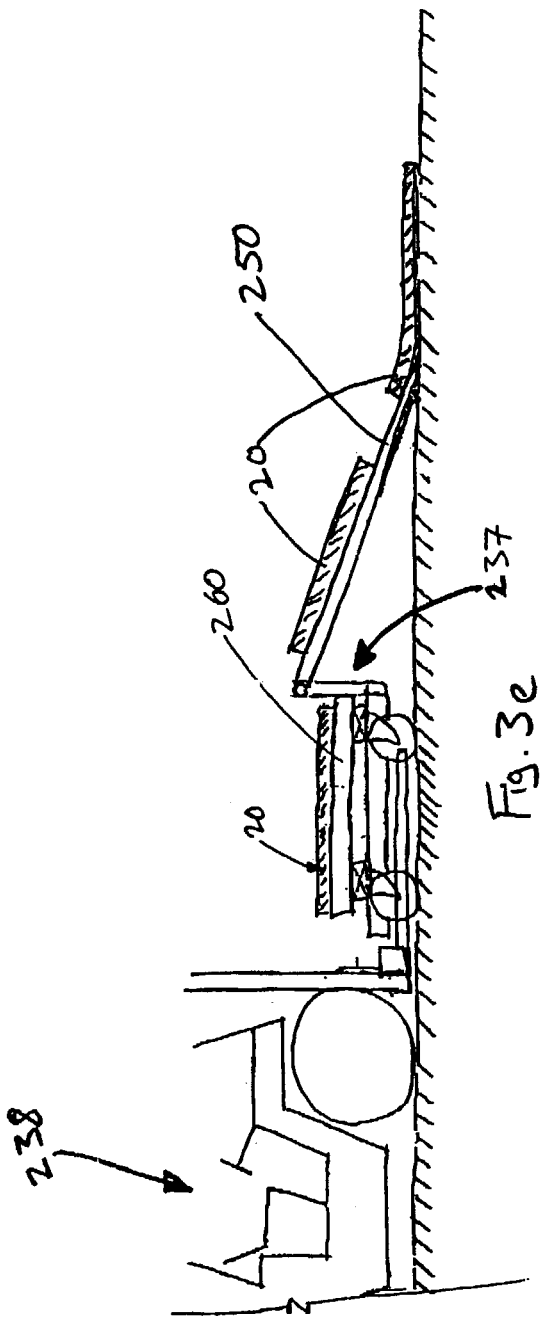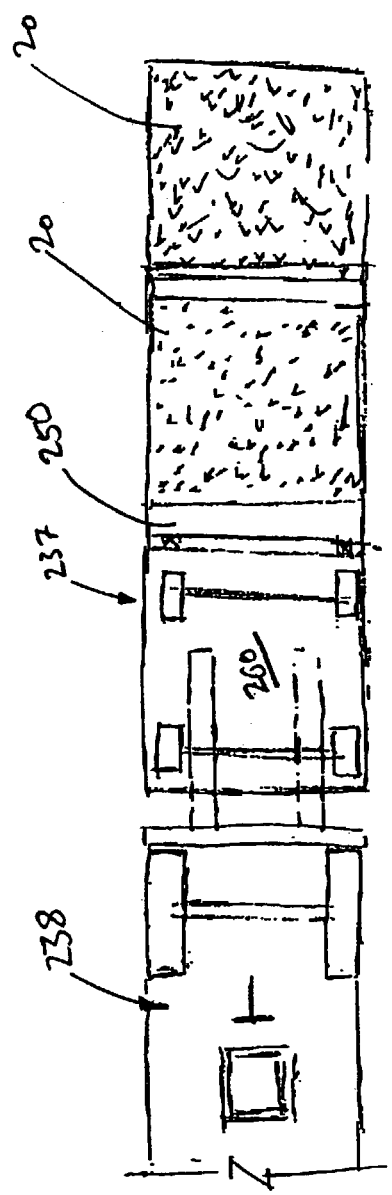

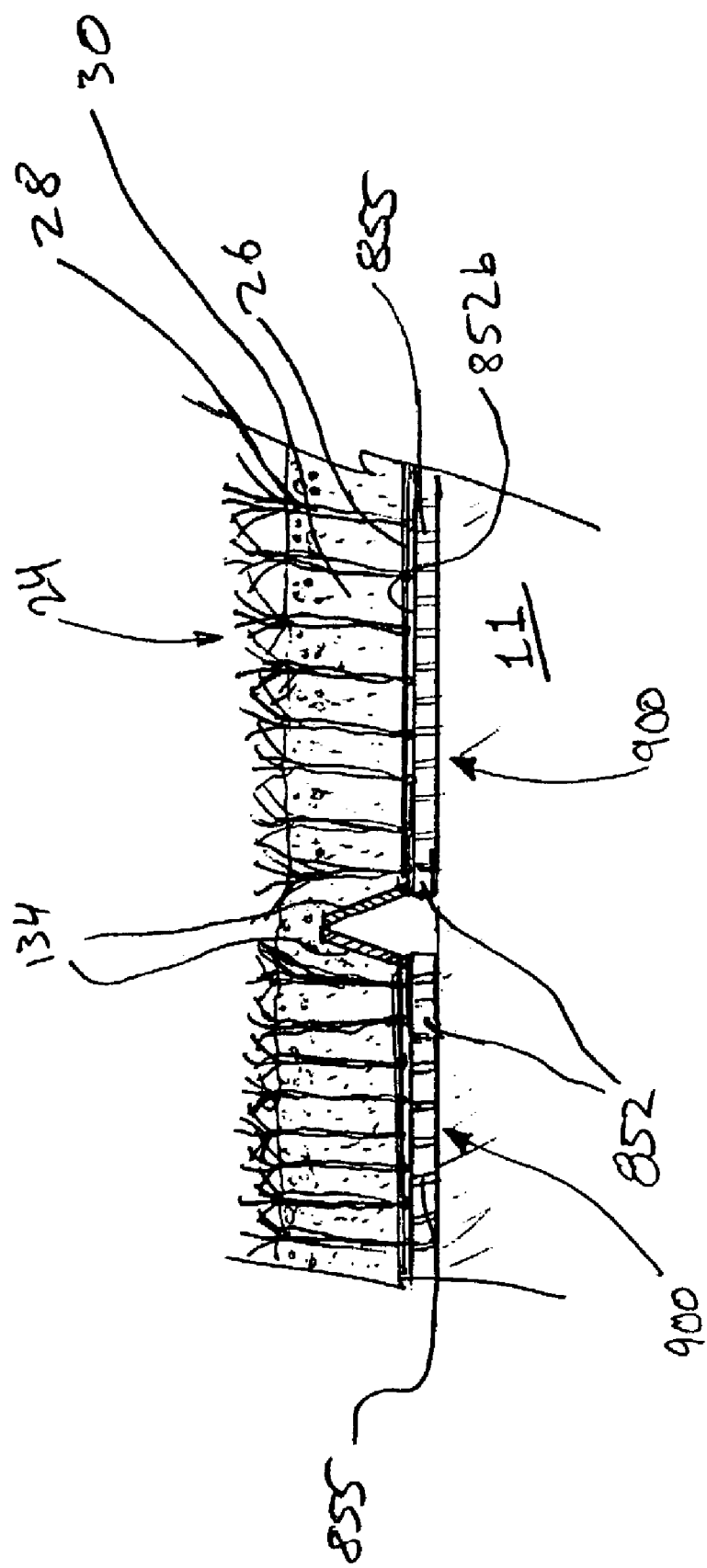

MODULAR SYNTHETIC GRASS TURF ASSEMBLY

This application is a continuation-in-part of copending Application Ser. No. 09/944,167 filed on Sep. 4, 2001, now abandoned the entire contents of which are hereby incorporated by reference and for which priority is claimed under 35 U.S.C. §120. Also, priority is claimed under 35 U.S.C. §120 of Canadian application 2,317,250 filed in Canada on September 1, 2000.

TECHNICAL FIELD

The invention relates to a synthetic grass turf to provide a synthetic grass activity surface, and more particularly, to a modular synthetic grass turf assembly adapted to provide various field surfaces for multiple purposes.

BACKGROUND OF THE INVENTION

A stadium is a desirable venue for multiple purposes. Such a stadium may be used both for football and baseball activities as well as other social and civic events. This presents a challenge to the operator to convert the field surface to a different style for the particular sport or event and maintain the field quality that is required. This is especially difficult when such a conversion must be completed in a short period of time. For example, the Saturday afternoon baseball game field may need to be converted to a football game field for the Sunday afternoon game. Efforts have been made to develop a conversion system using natural grass trays which are well known in the industry. There are as many as 6,600 of these trays needed to be imported for a full field conversion from an artificial field surface to a natural grass surface. These natural grass trays prove to be very difficult and very costly to use since they are especially made not only to hold the natural grass but also to grow the grass thereon. The trays need appropriate drainage and moisture retention as well as an interlocking mechanism to keep them in place. The cost of maintaining these trays is enormous. They need to be tended to daily and the growing conditions are critical. Therefore, in winter, they need to be trucked south to grow and be maintained, or to be heated in winter use in northern climates. Such natural grass trays, for example, are described in U.S. Pat. No. 5,595,021, Jan. 21, 1997, and U.S. Pat. No. 5,187,894, Feb. 23, 1993, both to Ripley, Sr. et al. Ripley, Sr. et al describes natural turf units for stadia and other activity surfaces, which are transportable between first and second locations, the first location being a location for the performance of the desired activity, and the second location being for the growth and maintenance of the turf units.

Synthetic grass turf assemblies have been used instead, to provide game playing surfaces. The advantages of synthetic grass turf are well known. However, the existing infilled synthetic grass turf assemblies are generally for permanent installation in stadia, are not transportable and not adapted for conversion either entirely or in part.

Therefore, there is a need for a method of using infilled synthetic grass turf assemblies to provide convertible and transportable game playing surfaces.

SUMMARY OF THE INVENTION

It is a primary object of the invention to provide a modular synthetic grass turf assembly adapted for conversion of a game playing surface to other applications or other sports.

It is another object of the invention to provide a modular synthetic grass turf assembly adapted to provide a transportable surface for temporary use in halls, gymnasia or other large areas that could be converted to part-time sports applications.

It is another object of the invention to provide a modular synthetic grass turf assembly adapted for use in permanent or temporary sites for roadside advertisements, logos, field lettering, field markings and the like.

It is a further object of the invention to provide a method for installing a synthetic grass turf assembly on a field using prefabricated synthetic grass units to reduce site work.

It is still a further object of the invention to provide a method for converting a sports field to other applications or other sports with fewer difficulties and at lower costs.

In general terms in accordance with the present invention, there is a synthetic grass unit provided for a modular synthetic grass turf assembly. The unit comprises a base sheet, and a synthetic grass system supported on the top of the base sheet, the base sheet being adapted to be laid flat on a support surface and fit side by side with respect to other such synthetic grass units to provide a substantially flat, substantially continuous, synthetic grass turf surface. The base sheet preferably includes drainage means for draining water away from the unit, and the synthetic grass system preferably includes a synthetic grass turf with an infill layer of a particulate material disposed interstitially between the synthetic grass ribbons to provide a field quality that is required.

More especially, according to an embodiment of the invention, the base sheet is made of recycled plastic materials and extruded preferably with drainage grooves on a top and a bottom thereof, forming a rectangular sheet having a thickness from a range of ⅛ inch to 5 inches. The base sheet may be provided in panels of 15 feet by 48 feet. The synthetic grass system, including an infill layer, is installed on the top of the base sheet. The base sheet is inherently flexible, such that it can be laid flat in almost any weather on uneven surfaces, and is able to accommodate uneven substrate surfaces without causing corresponding uneven regions in the synthetic grass system overtop. Therefore, the synthetic grass units can be installed on stabilized sand, crushed stone, asphalt, concrete, graded and compacted earth, on other artificial surfaces, and on any firm substrate to provide a synthetic grass surface with the field quality that is required.

In accordance with another aspect of the invention, there is provided a modular synthetic grass turf assembly which comprises a plurality of synthetic grass units. Each unit includes at least a base sheet and a synthetic grass system supported on a top thereof, and the units are made to strict tolerances to ensure the units can individually fit side by side to provide a substantially flat, substantially continuous, synthetic grass surface when the units are laid flat on a field surface. The base sheets are made of extruded recycled plastic materials and rubberized laminated fabrics such as conveyor belt type of material that lays flat and is flexible. Preferably the sheets will have drainage grooves thereon and preferably in standard sizes and shapes, for example, a rectangular shape of 5 feet by 10 feet or 4 feet by 8 feet. The sheets can also be up to 40 feet in length for the recycled plastic reinforced material, and from 15 feet wide to 48 feet long for the rubberized type of laminated or extruded fabric. These materials can vary from ⅛ inch to 5 inches in thickness.

The modular synthetic grass turf assembly may also include a number of units having other than rectangular outlines and different colours representing letters, logos and other marks, and/or a number of units having such letters, logos and other marks, illustrated on the top thereof, so that the modular synthetic grass turf assembly is adapted to have logos and marks installed on one or a pattern of units. The logos and marks can be changed quickly and at low cost for installing a visiting team's logo and name at one end of the field. Advertising can be placed on fields for short periods of time since they can be easily replaced with other advertising or just replaced with an all green surface that would not reflect any pattern as is seen on painted artificial turf surfaces.

The modular synthetic grass turf assembly is also adapted for easy use in permanent or temporary sites for road side advertisements, for municipal logos, for field lettering and markings, and for many other uses. The most likely use of the modular synthetic grass turf assembly according to the invention is for conversion of fields to other applications or other sports, and for providing a modular synthetic grass surface used to cover areas which may require sections thereof changed, such as the terrain surrounding airport runways for example. As a transportable surface, it is also adapted for temporary use in halls, arenas, gymnasia, and other large areas that could be converted to part-time sports applications.

In accordance with the present invention, there is provided a unit for a modular synthetic grass turf assembly comprising a base sheet adapted to be laid flat on a support surface, and a synthetic grass system laid on top of the base sheet, said synthetic grass system including at least a sheet backing, a plurality of synthetic ribbons extending upward therefrom and an infill layer of particulate material disposed interstitially between said synthetic ribbons on said sheet backing, said base sheet having at least one drainage aperture extending therethrough and being adapted to be laid flat on a support surface, and to fit side by side with respect to a base sheet of another such adjacent unit to provide a substantially flat and substantially continuous synthetic grass surface.

There is also provided, in accordance with the present invention, a unit for a modular synthetic grass turf assembly comprising a base sheet adapted to be laid flat on a support surface, and a synthetic grass system laid on top of the base sheet, said synthetic grass system including at least a sheet backing, a plurality of synthetic ribbons extending upward therefrom and an infill layer of particulate material disposed interstitially between said synthetic ribbons on said sheet backing, said unit comprising edge borders upwardly extending therefrom around a perimeter thereof for retaining said infill layer, said base sheet comprising at least one tile having a plurality of drainage apertures therethrough, said base sheet being adapted to abut a similar base sheet of an adjacent such unit to provide a modular synthetic grass turf assembly having a substantially continuous base sheet layer on said support surface and a substantially continuous synthetic grass system superimposed thereon.

In accordance with a further aspect of the invention, a method is provided for installing a synthetic grass turf on a field. The method comprises steps of obtaining at a first location a plurality of synthetic grass units, each having a base sheet preferably with means for draining water away and a synthetic grass turf system secured on a top of the base sheet preferably with an infill layer of a particulate material disposed interstitially between the grass leaves; transporting the units from the first location to a second location to lay the units side by side on a prepared support surface to provide a substantially flat and substantially continuous synthetic grass surface; and top dressing the synthetic grass surface on site. If high drainage is required under the modular synthetic grass turf assembly, a geonet™ layer is preferably secured to the bottom of the base sheet of each unit at the first location, or when the units are fabricated. The modular units can comprise drainage tiles. Further, the drainage tiles can be provided independently from the modular units and assembled on the support surface, after which the modular units can then be installed on top of the drainage tiles. The first location is usually a workshop or a storage house for receiving and storing the prefabricated base sheets and synthetic grass systems which come either separately or as in pre-assembled units. The latter is a more likely circumstance.

The support surface on which the modular synthetic grass turf is to be installed may be prepared with a surface made of stabilized sand, crushed stone, asphalt, concrete, graded and compacted earth, other artificial surfaces, or any firm substrate.

The advantage of a modular synthetic grass turf assembly is in the easy conversion of fields to other applications or other sports and the convenience for field and roadside advertisements. The synthetic grass units installed on the recycled plastic sheets or trays are easily handled by a forklift vehicle to which a metal plate has been mounted to its fork arms to actually lift the units.

The storage area needed is far less than that which is required for the natural grass tray system. About 24 synthetic grass units or more can be stored on a standard 12 foot high storage rack. The units measuring 4 feet by 8 feet can weigh 460 lbs. each and, therefore, more than one unit can be carried by smaller forklift trucks or other battery operated lifting equipment. Some portable surfaces may weigh far less.

Other advantages and features of the invention will be better understood with reference to the preferred embodiments described below.

BRIEF DESCRIPTION OF THE DRAWINGS

Having thus generally described the nature of the invention, reference will now be made to the accompanying drawings showing, by way of illustration, preferred embodiments in which:

FIG. 1 is a schematic cross-sectional view of a modular synthetic grass turf unit incorporating a preferred embodiment of the invention;

FIG. 2 is a similar view to that illustrated in FIG. 1, showing a forklift vehicle used to lift the unit for transportation and installation;

FIG. 3a is a perspective sketch, showing a sheet of metal attached to the forklift arms for supporting the unit thereon;

FIG. 3b is a side elevation sketch of an alternate forklift vehicle used to displace the unit for removal or installation;

FIG. 3c is a side elevation sketch of the forklift vehicle of FIG. 3b used with a movable stacking tray for receiving the unit;

FIG. 3d is a side elevation sketch of the forklift vehicle of FIG. 3b adding a unit onto the movable stacking tray of FIG. 3c;

FIG. 3e is a side elevation sketch of a continuous unit removal system, including a stacking rack vehicle and a forklift vehicle;

FIG. 3f is a top plan view of the continuous unit removal system of FIG. 3e;

FIG. 21 is a partial vertical cross-sectional view of the abutting drainage tiles of FIG. 20 installed on a support surface to provide a continuous synthetic grass surface.

DETAILED DESCRIPTION OF THE PREFERRED EMBODIMENT

Figure 4:
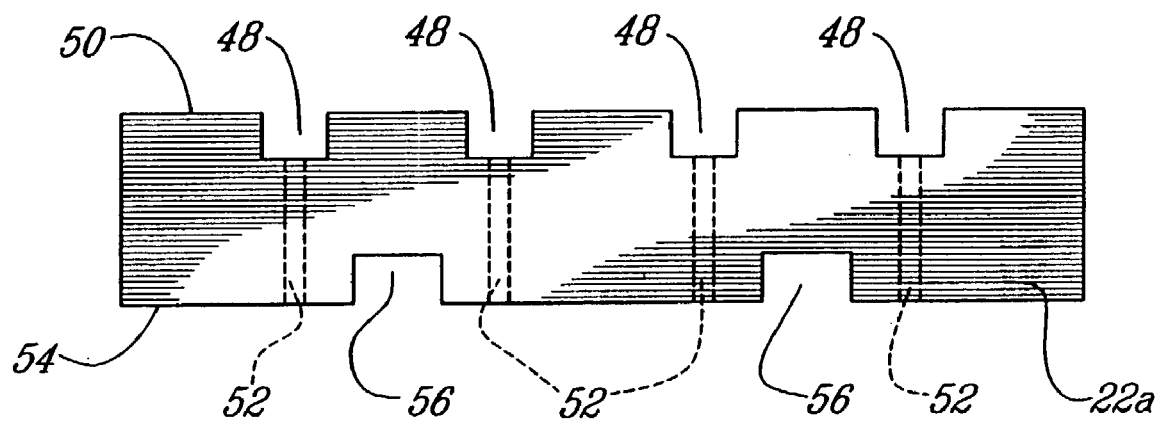
FIG. 4 is a side view of a base sheet of the synthetic grass unit according to another embodiment of the invention.
Figure 5:
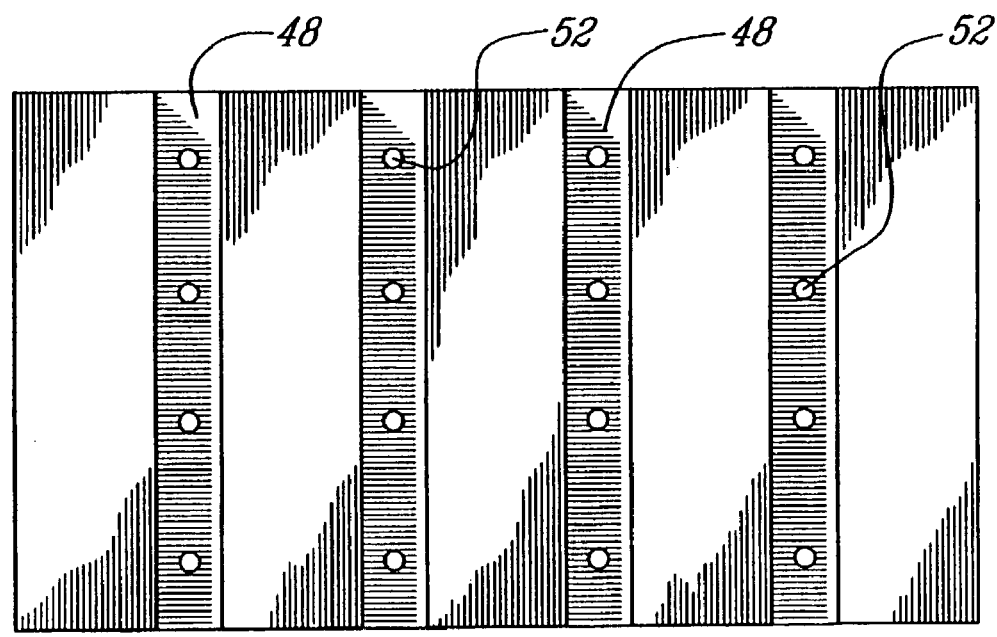
FIG. 5 is a top plan view of the embodiment illustrated in FIG. 4.

Referring to the drawings, and in particular to FIG. 1, a synthetic grass unit 20 is illustrated. The unit 20 includes a flexible base sheet 22 made of recycled plastic materials, measuring from 4 feet by 8 feet or longer and varies from ⅛ inch to 5 inches in thickness. The base sheet 22 can also be resilient, but need not necessarily be. In this particular embodiment, the unit 20 is 4 feet by 8 feet, and 1 inch in thickness. The units 20 are preferably made from a continuous extruding process and cut into individual units. The material can also be made of a rubberized laminated fabric that is strong enough to withstand the pulling action of the fabric with the grass on it. A synthetic grass system 24 is placed on the top of the base sheet 22 and includes a sheet backing 26 and a plurality of synthetic ribbons 28 extending upwardly from the sheet backing 26, representing grass fibers. An infill layer 30 of a particulate material including rubber granules and sand and or only rubber granules and or only sand is deployed between the synthetic ribbons 28 to further improve the quality of the synthetic grass unit 20 for impact absorption. The synthetic grass system 24 including the infill layer 30 used in synthetic grass turf assemblies which are permanently installed is well known in prior art and is described, for example, in U.S. Pat. No. 5,958,527, issued to Prevost on Sep. 28, 1999 and assigned to the Assignee of this application, which is incorporated herein by reference. Preferably, the sheet backing 26 of the synthetic grass system 24 is not permeable, however perforations can be provided therein to improve drainage therethrough, however a geo-textile sheet is then preferably provided beneath the sheet backing 26 to ensure that the particles of the infill layer 30 do not drain down through the sheet backing 26.

The synthetic grass system 24 is wider than the base sheet 22 so that a strip portion 32 at each side thereof extends over the side edge of the base sheet 22 and suspends downwardly. A metal bar 34 having a length equal to or smaller than the length of the base sheet 22, preferably ½ inch wide and 8 inch thick, is provided at each side of the unit 20 to secure the synthetic grass system 24 to the base sheet 22. The metal bar 34 includes a plurality of mounting bores (not shown) for receiving mounting screws 36 extending therethrough and threadably engaged in the side of the base sheet 22 so that the metal bar 34 presses the strip portion 32 of the synthetic grass system 24 against the side of the base sheet 22. It is noted that the upper edge of the metal bar 34 must be lower than the top surface of the sheet backing 26 of the synthetic grass system 24 so that it is buried by the synthetic ribbons 28 and the infill layer 30 when the synthetic grass units 20 are placed side by side to form a continuous synthetic grass surface. The metal bar 34 should never protrude above the synthetic grass surface even when an area of the synthetic grass surface adjacent to the metal bar 34 is pressed down under a load.

The synthetic grass unit 20 is conveniently transportable using a forklift vehicle 38 as shown in FIG. 2. The base sheet 22 is preferably bevelled at one side as indicated at numeral 40 to facilitate the insertion of the fork arms 42 of the forklift vehicle 38. It is preferred to provide a metal sheet 44 which is more clearly illustrated in FIG. 3a, to fully support the unit 20 in a horizontal position when the unit 20 is lifted and transported by the forklift vehicle 38. The synthetic grass unit 20 may be deformed under its own weight if the unit is supported directly on the forklift arms 42 without the metal sheet 44. The metal sheet 44 is preferably 7 feet long and about 4 feet wide to fit under the 8 foot by 4 foot base sheet 22 of the unit 20 and has two or more sleeves 46 welded to the underside of the metal sheet 44 into which the forklift arms 42 can easily slip.

It is also preferred that the forklift arms 42 are longer than the width of the metal sheet 44 whereby the tip portions of the forklift arms 42 protrude from the outside of the metal sheet 44 and are enabled to penetrate the stacking rack. This will keep the space between the units 20 to a minimum, resulting in more units 20 per moveable rack and much less storage room required.

Alternately, as shown in FIGS. 3b to 3d, the forklift vehicle 138 comprises a base spatula 144 including a conveyor belt mechanism 150, which can be used to individually remove and re-install modular tray units of the present invention. Therefore, as shown in FIG. 3b, the spatula 144, vertically positioned near the ground level, is moved forward by the forklift vehicle 138 such that a forward blade portion 152 at the tip of the spatula 144 is forced under the base sheet 22 of the modular synthetic grass turf unit 20, and the conveyor belt mechanism 150 is rearwardly activated in a direction opposite to the forward movement of the spatula 144. The modular trays or units 20 are thereby drawn completely onto the spatula 144 of the forklift vehicle 138. The unit 20 can then be transported by the forklift vehicle onto a moveable stacking tray 160, as shown in FIG. 3c, on which a removable pallet 162 is disposed for receiving the disassembled individual turf units 20 stacked thereon. The conveyor belt mechanism is reversed once the spatula 144 is overtop the stacking tray 160, such that the turf unit 20 the tray or unit 20 will be propelled forward to displace the turf unit 20 from the spatula 144 onto the removable pallet 162, as shown in FIG. 3d. Once several such turf units 20 have been removed from the turf surface and stacked onto the removable pallet 162, another forklift is preferably used to pick up the full pallet 162 and remove it from the installation for displacement to a designated storage location. Once a pallet is removed, another is replaced on the moveable stacking tray 160, such that the process is barely interrupted. In order to re-install the stored turf units 20 to re-assemble the synthetic grass turf assembly, this process is simply reversed.

The following alternate method and system for removing and re-installing the modular tray units of the present invention can also be used, in order to provide a substantially continuous process for the removal and/or re-installation of the modular units. The ability to provide a substantially continuous removal displacement process of the modular tray units greatly reduces the time required for their removal or re-installation, which can be important when a modular synthetic grass assembly must be converted to an alternate application, such as when converting a stadium activity surface from one sport to another. Referring to FIGS. 3e and 3f, a stacking rack vehicle 237 comprising a fixed, inclined spatula 244 having a conveyor belt mechanism 250 thereon is provided for lifting the modular synthetic grass turf units 20 from the support surface and feeding them backwards towards the vehicle. The vehicle 237 can either be self propelled, or is pushed forward by the forklift 238. The stacking rack vehicle 237 preferably has a hydraulic or electric system to operate the conveyor belt and stacking tray lift mechanism. However, the vehicle can also be integrally formed with a forklift vehicle 238, rather than being separate entities. Rather than the modular turf units 20 having to be transported by the vehicle 237 to a separate moveably stacking tray for stacked collection, a stacking tray 260 is provided on the vehicle 237 itself rearward of the front spatula 244, such that modular turf units 20 can be continuously drawn up the spatula 244 by the conveyor belt mechanism 250 and deposited onto the stacking tray 260 while the vehicle 237 continues forward. Once full, the stacking rack 260 can be removed by a forklift vehicle 238, and replaced by a new empty stacking rack 260. The stacking rack 260 in FIG. 3e preferably comprises a mechanism to raise and lower the rack, so that the stacking rack 260 can be substantially aligned with the top of the conveyor belt 250 at the highest point thereof, permitting a smooth transition for the modular units 20 as they are transferred from the inclined conveyor belt mechanism 250 and the horizontal stacking rack 260. Once a modular unit 20 is deposited on the stacking rack 260, it is lowered slightly so that the next modular unit 20 will arrive level with the top of the stacked modular units on the stacking rack.

When the stacking rack 260 is integral with the forklift vehicle 238, it can be disposed either on the front of the forklift, or can alternately be located elsewhere on the vehicle, such as on a lateral side thereof or at the rear of the vehicle. If the stacking rack 260 is laterally positioned on the forklift vehicle, an additional displacement mechanism, such as another conveyor, is preferably provided to feed the modular turf units 20 from the end of the conveyor belt mechanism 250 of the spatula 244 toward the stacking rack 260.

With the stacking rack located at the rear of the vehicle, a conveyor belt preferably extends overtop of the vehicle to transport the modular turf units 20 straight back and stacked on the stacking tray at the rear of the vehicle. This rear stacking tray can therefore be easily removed from the rear of the vehicle and replaced with an empty one, once the previous stacking tray has been filled. By displacing the modular turf units 20 in a straight line, the removal and installation process is simplified, and eliminates the need to provide additional alignment mechanisms to ensure that the units are properly aligned when stacked. Further, as the filled stacking trays can be easily removed from the rear of the vehicle, a substantially continuous and efficient removal process is provided. The vehicle can therefore be moved forward at a steady speed, permitting the removal of many modular turf units without stopping the removal process. Therefore, the modular turf units 20 can be substantially continuously removed from the support surface and collected on the stacking rack which displaces with the vehicle as it moves forward to remove the next modular turf unit 20. It is also to be understood that the above process simply has to be reversed in order to re-install the modular turf units 20 onto a support surface.

A drainage system is necessary if the synthetic grass units 20 are used to assemble a synthetic grass surface in an outdoor stadium. FIG. 4 illustrates another embodiment of the flexible base sheet 22a which is also extruded from recycled plastic materials. A plurality of drainage channels 48 are provided at the top surface 50 of the base sheet 22a which may be extruded at the same time as the base sheet 22a is fabricated. A plurality of drainage bores 52 is provided in each drainage groove 48, spaced apart from one another and extending vertically through the base sheet 22a to drain water from the synthetic grass system 24 placed on the top thereof, similar to that shown in FIG. 1, down to a drainage system (not shown) below the base sheet 22a. Similar drainage grooves can be extruded at the bottom surface of the base sheet 22a (not shown) so that water can be collected in and drained away through the drainage channels formed on the bottom surface 54 of the base sheet 22a when the drainage grooves of each synthetic grass unit 20 align with those on adjacent units. The cross-section of the drainage channels 48 is not necessarily square and might be any shape, such as a semi-circle. One or two alignment channels 56 may be extruded on the bottom surface 54 of the base sheet 22a. The drainage bores 52, however, are drilled as a separate process.

The extruded channels 56 and the additional drainage grooves extruded on the bottom surface of the base sheet 22a will restrain the entire unit 20 from moving backward or forward when the forklift vehicle 38 shown in FIG. 2 either deposits the unit 20 on the rack or picks up the unit 20 from the rack.

Figure 16:
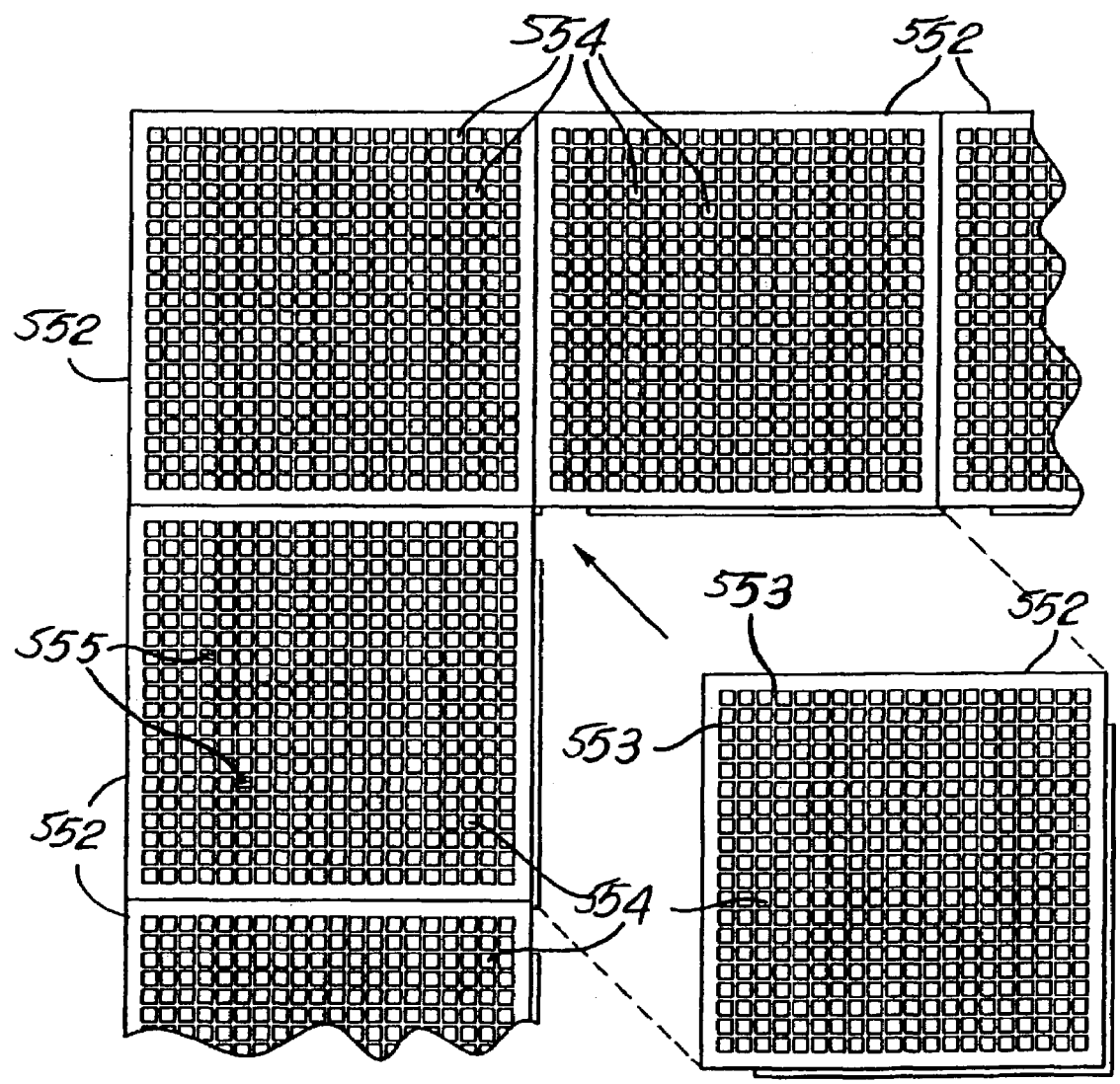
FIG. 16 is a plan view of a drainage system base sheet layer of drainage tiles used in accordance with another embodiment of the modular synthetic grass turf assembly of the present invention.

Alternately, the base sheets of the synthetic grass units 20 are drainage tiles, as depicted in FIGS. 16 to 19, which provide drainage means for the synthetic grass unit 20, and therefore for a synthetic grass surface in an outdoor stadium when a plurality of synthetic grass units 20 are assembled together. Preferably, the drainage tiles 552 of FIG. 16 are generally square but can similarly be of various shapes. The tiles 552 include intersecting grooves or channels 553 defining square lugs 554. The opposite surface of the tile 552 would have similar channels 553 and lugs 554. Through openings 555 extend from one surface to the other and provide drainage passages for the flow of water through the tile in a direction normal to the support surface, which is generally substantially vertical, and communicate with the channels 553 in order to evacuate the water substantially horizontally, namely parallel to the support surface. The interconnected tiles would normally sit on the support substrate and would be in direct contact with the sheet backing 26 of the synthetic grass system 24, in order to allow the water to pass through the backing 26 and then along the channels 553, on the top of the tiles 552, or through the openings 555 to access the channels 553 on the bottom of the tiles.

Figure 17:
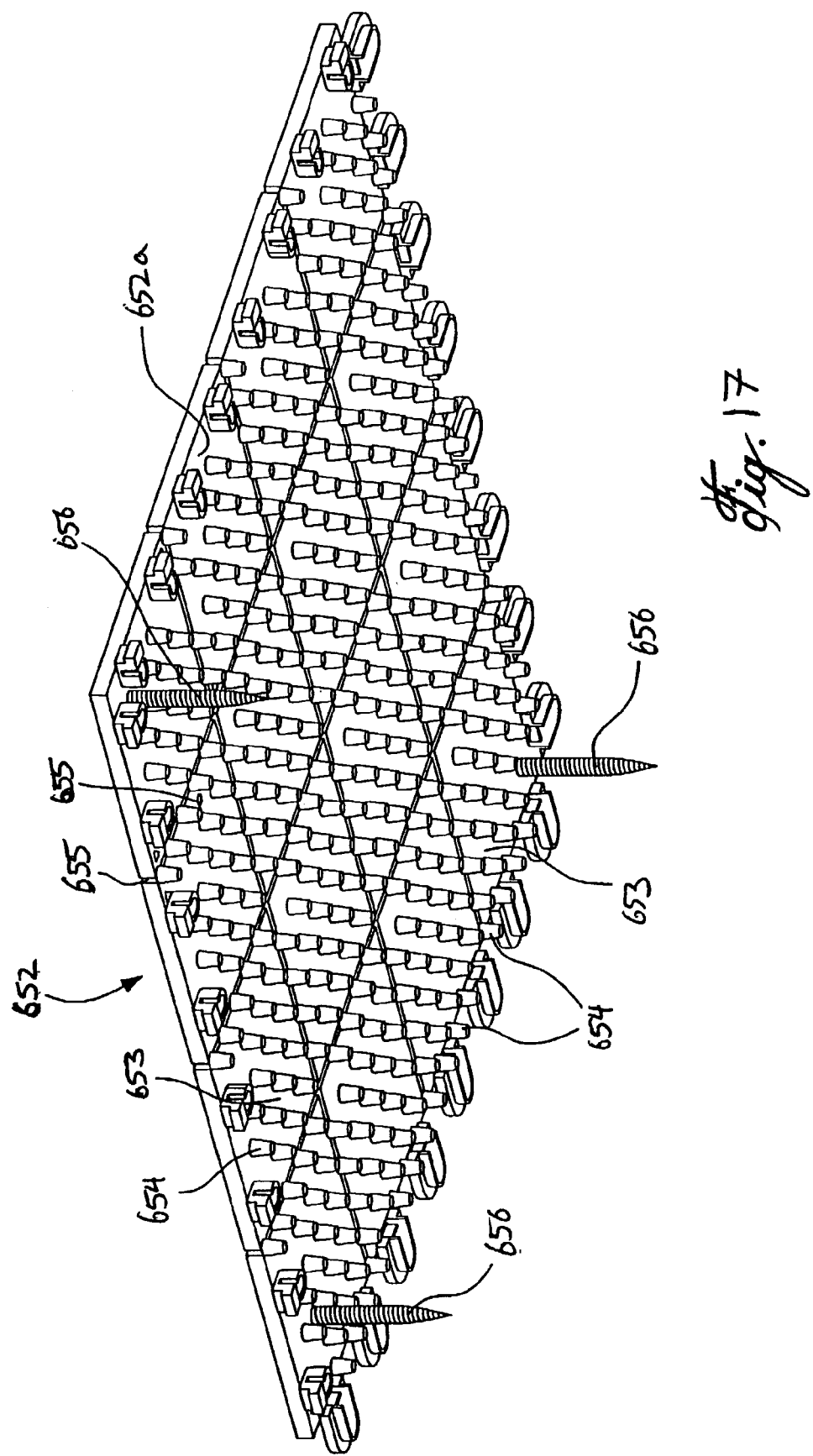
FIG. 17 is a perspective view from the bottom of an alternate embodiment of a drainage tile.

FIG. 17 shows another embodiment of a drainage tile 652 which can be used as a base sheet of the synthetic grass unit 20. The drainage tile 652 includes a bottom surface 652*a* and a plurality of legs 654 extending from the bottom surface 652*a*. The legs 654 define channels 653, which provide the necessary drainage away from said tile in any direction, the water generally following a direction of least resistance away from said tile. Through openings 655 are provided to allow drainage perpendicular to the tile 652. Fasteners 656 can be used to anchor the tiles to the supporting ground substrate. However, fastening means such as the fasteners 656 are not necessarily required. The weight of the infill 30 of the synthetic grass system 24 generally provides enough downwards force to hold down the tiles. Nonetheless, fasteners 656 can be used if it is necessary to fasten the tiles in place on the supporting ground substrate.

Figure 18:
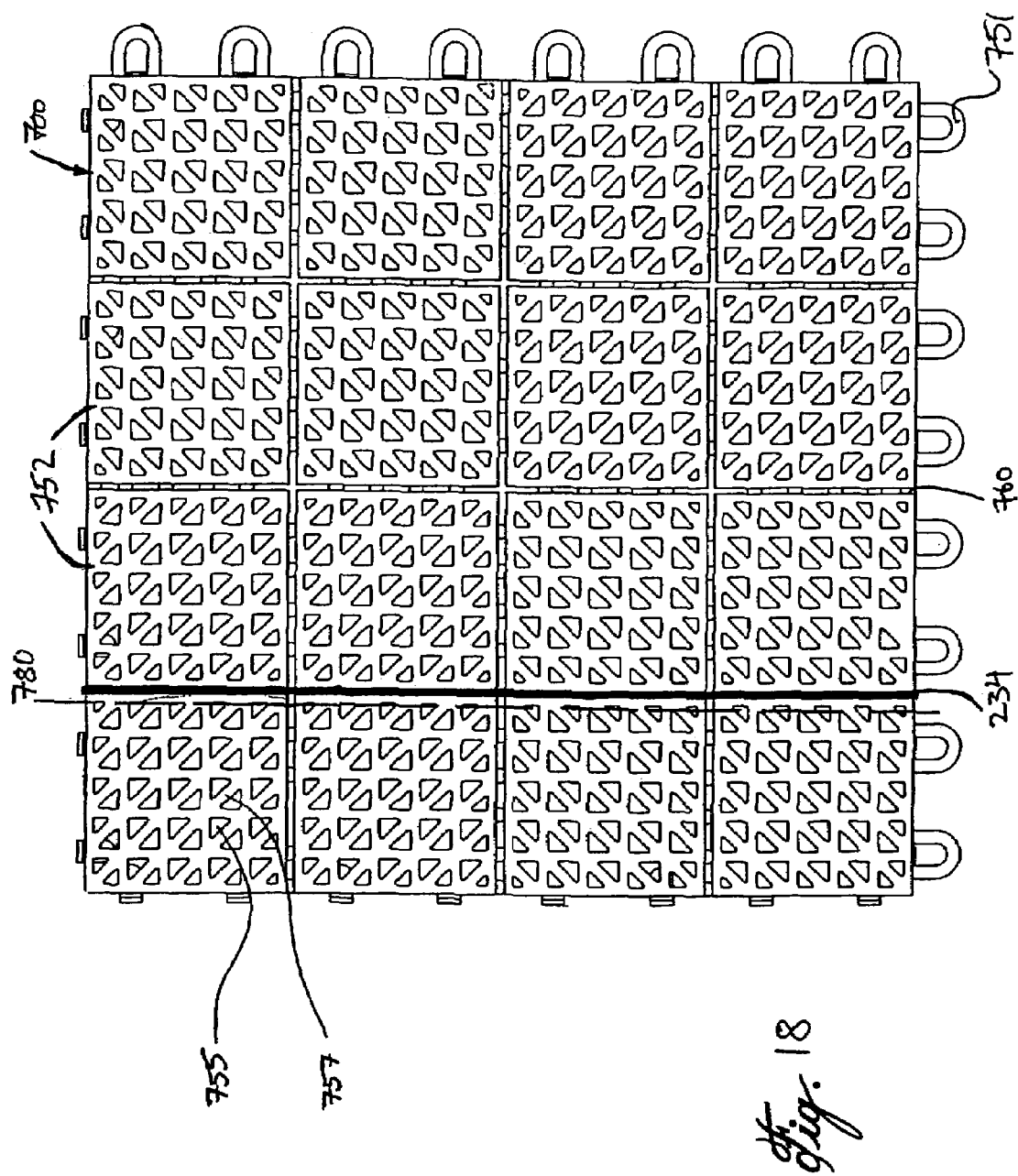
FIG. 18 is a top plan view of still another embodiment of a drainage tile.
Figure 19:
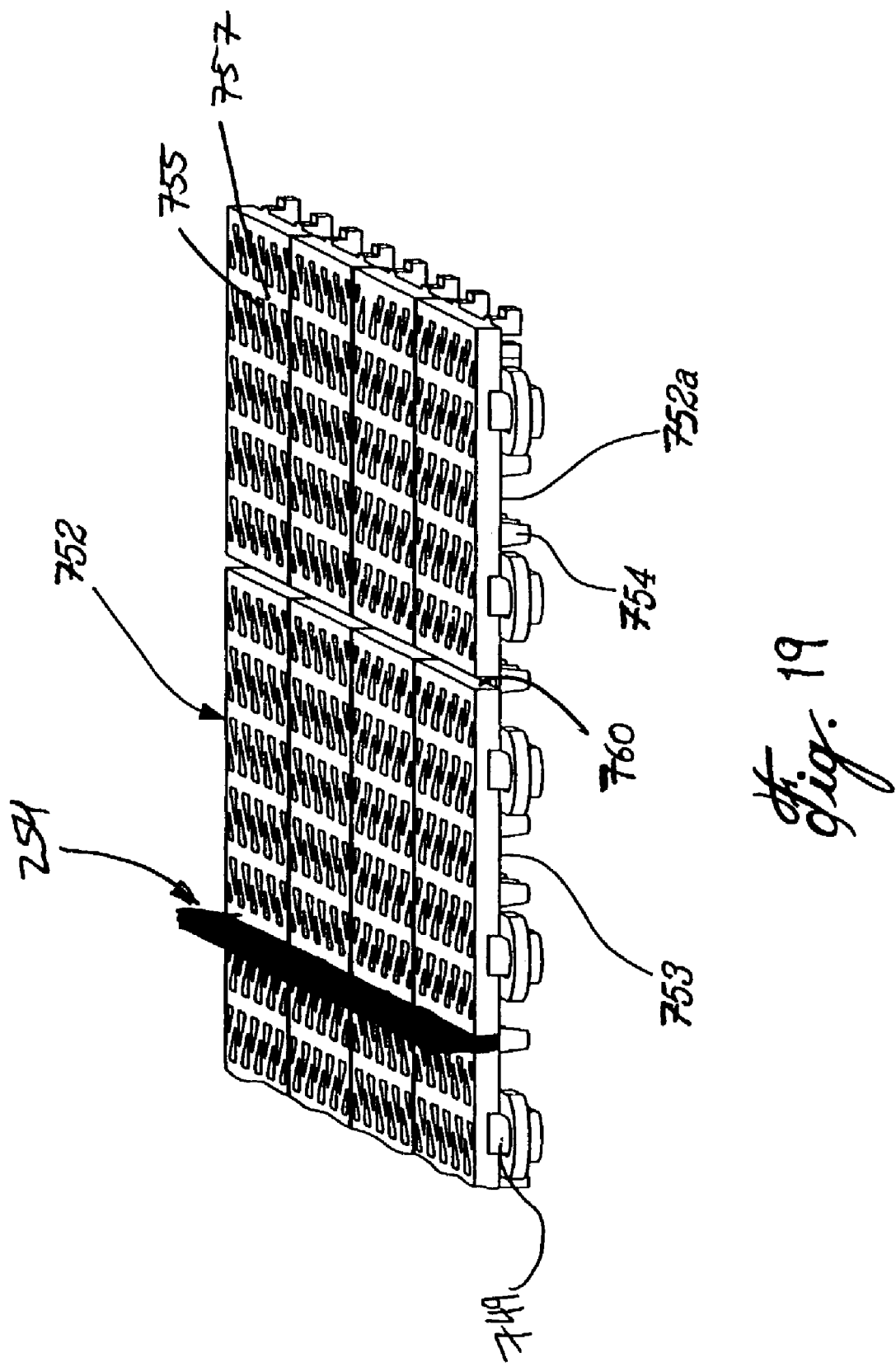
FIG. 19 is a partial perspective view, taken from the side, of the embodiment shown in FIG. 18.

In yet another embodiment shown in FIGS. 18 and 19, a tray 700 is comprised of a plurality of tiles 752, which include through openings 755 as a pattern of openings defined by links 757. Legs 754 are provided on the bottom surface 752*a* to define the channels 753. The tiles 752 further comprise integrally formed male and female connection members 749 and 751 respectively, disposed around the edges of each tile for engagement with a mating connection member of an adjacent tile 752. These connection members permit the tiles 752 to be easily interlocked by simply snapping opposed connection members together in order to fasten together abutting tiles.

Figure 20:
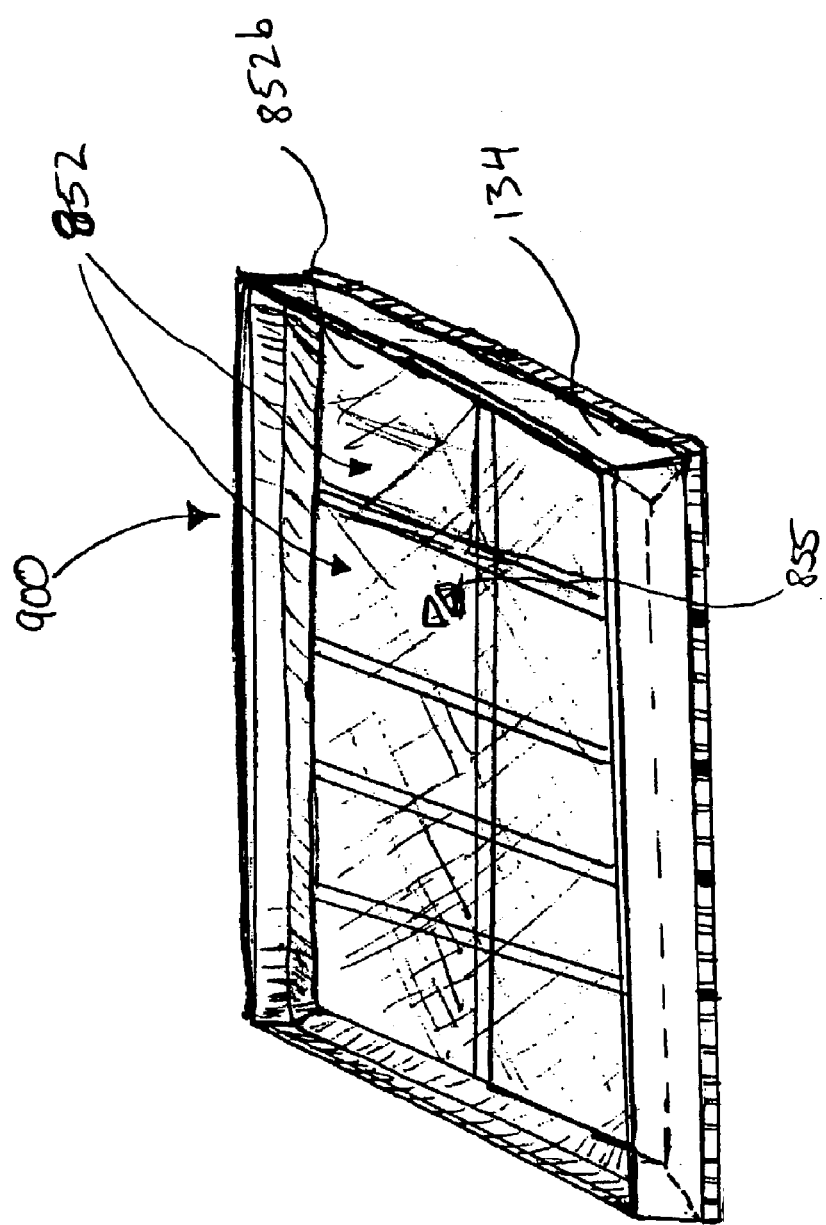
FIG. 20 is a perspective view of a drainage tile in accordance with yet another embodiment of the modular synthetic grass turf assembly of the present invention.

In a further embodiment, a tray unit 900 comprises at least one drainage tile 852, and has upstanding borders 134 fixed thereto around the perimeter thereof, as shown in FIGS. 20 and 21. The borders 134 are preferably semi-rigid rubber "L"-shaped members, fastened to the upper surface 852*b* of each tile, which retain the infill layer 30 of the synthetic grass system 24 within the tile or within a tray unit made up of a plurality of tiles. The upper surface 852*b* of each tile, and those of the other tiles previously described, all preferably have a textured finish, which helps retain the synthetic grass system in place thereon, when adhesives are not being used, through friction in addition to the weight of the grass. The tray unit 900 comprises several interconnected tiles 852 and has edge borders 134 around the full perimeter of the tray to retain the infill with the tray unit. The edge borders 134 are either permanently fastened to the tiles using adhesive or are removably fixed thereto using clip-on engagement means. Accordingly, when the tray units are disassembled and removed from the ground substrate 11, most of the infill remains held within the borders 134 on the tiles 852 within each tray unit 900. The disassembled trays can then be stored or transported as is, without having to completely remove all of the infill layer 30 of the synthetic grass system 24 before being able to remove the trays 900 or individual tiles 852 from the ground substrate 11. Further, although connection members are disposed on the peripheral edges of the tiles 852 within the tray 900 as per the drainage tiles 752 of FIGS. 18 and 19, the peripheral edges of adjacent trays 900, having borders 134, are preferably not fastened to each other but are merely abutted together, and therefore the tiles 852 which are situated at the peripheral edges of the trays 900 preferably do not have connection members thereon. Continuous removal of the modular units comprising such tiles is therefore possible as no interlocking connection members between adjacent tiles need to be disengaged. This greatly simplifies the effort and time required to remove such a modular synthetic grass turf assembly, as may be required to convert a stadium field from one sporting surface to another for example. However, in certain applications for which interconnection between the modular units is required or preferred, the type of interconnection chosen is preferably easily disconnected, such that the removal of the modular units can nevertheless be simply and easily be performed.

Referring back to FIGS. 18 and 19, edge borders 234 can alternately be provided in grooves 760 between adjacent tiles 752. The edge borders 234 are preferably flat rubber blades, and do not require the L-shape configuration of the previously described edge borders 134 to permit engagement with the tiles 752. By inserting and adhering edge borders 234 within the existing grooves 760 defined between interlocked adjacent tiles 752, this simplifies the installation of the edge borders to the tiles 752. Therefore, in order to provide such edge borders 234 along a perimeter edge of a tray 700 comprised of a plurality of tiles 752, the flat edge borders 234 are first inserted into the grooves 760 between two adjacent tiles 752. However, once fixed in place, the borders 234 are disposed between two tiles 752 and not at the edge of a tile tray. Accordingly, a cut is then made, along cut line 780, through the tiles 752 along one side of the vertically upstanding edge border 234, to define an edge of a tiled tray 700 having the edge border 234 therealong. By cutting the tiles 752 located outward from the edge border 234, a tray is defined having a predetermined shape located within the edge borders 234. Further, as the edge borders 234 do not fasten to the upper surface of the tiles 752, but rather are inserted into the grooves 760, the edges of the tile trays remain flush, and therefore the synthetic grass system laid overtop remains flat even at the edges of each tray and the joints between adjacent trays. Accordingly, when the modular synthetic grass assembly is being used for a ball sport activity surface, ball roll irregularities at the joints between trays are reduced.

Further, the tiles 752 can be arranged on the substrate surface such that edge grooves 760 are aligned in pre-selected locations corresponding to an area of the synthetic grass surface which is to be configured for removal, such as a logo region on a sports activity surface. The tiles 752 can be arranged around this identified logo region, and the edge borders 234 are then installed within the predetermined grooves 760 around a perimeter delineating the logo area. Accordingly, a modular tray unit comprising the logo can then be simply dropped into the region defined within the edge borders 234. Alternately, the central region can initially be a continuously tiled portion of the tiles making up the base sheet of the modular synthetic grass assembly, the edge borders 234 nevertheless being installed within grooves 760 between tiles 752 and defining a region therewithin which is to be replaced. This central region of the tiles defined within the edge borders 234 can then be cut out, by making a cut in the tiles along the inner side of the edge borders 234. A modular tray unit 700 sized to fit within the cut our region within the edge borders 234 can then be dropped into place therein.

Referring now to FIG. 21, borders 134 on adjacent tile trays 900 are abutted together, forming a joint therebetween. Each border 134 is preferably angled slightly outwardly from the tile tray perimeter to which it is adhered, such that when abutting borders 134 are forced together, the semi-rigid borders 134 will be slightly biased towards one another, and thereby will tend to remain in pressed engagement with each another. In an alternate embodiment, mating borders 134 each comprise a magnetic element arranged such that it defines a magnetic pole opposite to that of a corresponding magnetic element on an abutting border. Magnetic force therefore retains abutting borders 134, and therefore abutting tiles 852, together in mating engagement with one another.

The tile trays 900 are preferably directly laid onto the support surface substrate 11 of the stadium or facility to have the synthetic grass turf thereon. The openings 855 within the individual tiles 852 which make up the trays 900 permit drainage therethrough. The turf sheet backing 26, which has the plurality of synthetic ribbons 28 extending upwardly therefrom, is laid onto the upper surface 852$b$ of each tile 852, and the infill layer 30 can then be interstitially added between the synthetic ribbons 28 within the borders 134 of the tile. Preferably, the turf backing sheet 26 is adhered to the upper surface 852$b$ and to the base of the L-shaped edge borders 134 around the perimeter of the tile. Once the adjacent tile trays 900 are positioned in place on the ground substrate, a final layer of infill is preferably added overtop in order to fully cover over the joints between abutting tiles. In this embodiment, no alignment tracks or other fastening means are required to retain the tiles in place on the support surface substrate 11. The weight of the infill 30 of the synthetic grass system 24 is sufficient to hold the turf sheet backing 26 in place on the tile trays 900, and similarly to hold the abutting trays 900 in place on the support surface substrate 11. This further simplifies installation and disassembly of the system on a large area, as the tiles can be continuously picked up without having to disengaged any attachment mechanisms disposed between adjacent modular base sheets, or remove any fastening means retaining the base sheets in place on the substrate.

Figure 6:
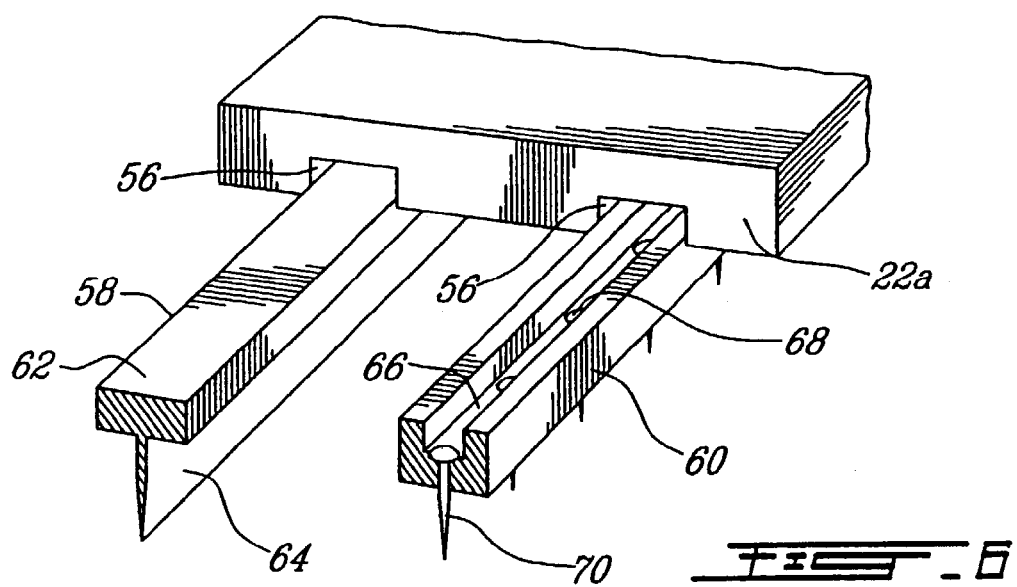
FIG. 6 is a partial perspective view of an embodiment of the invention, showing a synthetic grass unit sliding on alignment tracks.

Referring back to FIG. 6, alignment tracks 58 and 60 are illustrated for engagement with the alignment channels 56 of the base sheet 22$a$. The track 58 has a generally "T"-shaped cross-section, including a top beam section 62 and a relatively thin plate section 64 perpendicularly fixed to the middle line of the bottom surface of the top beam section 62, and extending longitudinally along the entire length of the beam section 62. The track 58 is attached to a ground surface by inserting the plate section 64 down into an existing groove extending on the ground surface until the beam section 62 abuts the ground surface. The track 60 is formed in a different structure from the track 58 as another example. The track 60 generally is a beam having a rectangular cross-section and a groove 66 on the top surface and extending longitudinally along its entire length. A plurality of mounting bores 68 is provided in the groove 66, spaced apart from one another for receiving mounting screws 70 (only one shown). The mounting screw 70 threadably engages the ground surface when the track 60 is mounted onto the ground surface.

Figure 7:
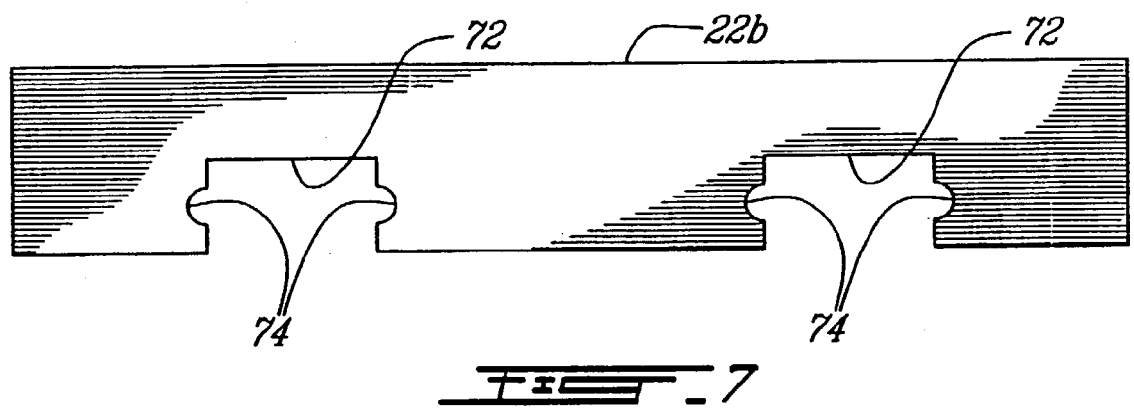
FIG. 7 is a side view of a base sheet of the synthetic grass unit according to another embodiment of the invention, showing an alternative structure of alignment grooves thereon.
Figure 8:
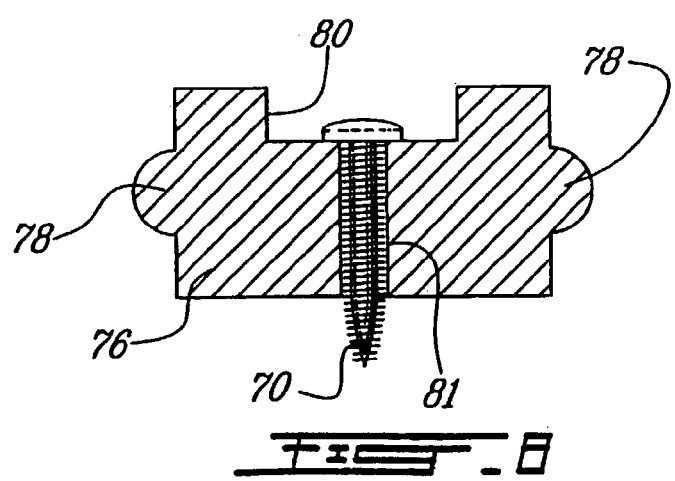
FIG. 8 is a schematic view showing a cross-section of an alignment track used for engaging the alignment grooves shown in FIG. 7.

The cross-section of the alignment channels 56 and the alignment tracks 58 and 60 may vary, and a further example is illustrated in FIGS. 7 and 8.

A flexible base sheet 22$b$ includes two alignment channels 72 as shown in FIG. 7. The base sheet 22$b$ may have other structural features similar to those shown in FIGS. 1 and 4, are not redundantly described and not shown in FIG. 7. The alignment channel 72 has a generally rectangular cross-section and a semi-circle cross-sectional groove 74 extending on each side wall of the alignment channel 72 along the entire longitudinal length. Accordingly, the alignment track 76 includes a corresponding ridge 78 having a semi-circle cross-section protruding from each side of the track 76, and extending longitudinally along its entire length. Similarly to the track 60, the track 76 has a longitudinal groove 80 and a plurality of mounting bores 81 (only one shown) in the grooves 80 extending through the track 76 for receiving the respective mounting screws 70. The alignment track 76 not only ensures that the adjacent synthetic grass units 20 are aligned with one another but also prevent each unit from being lifted upwardly from the ground. The alignment function of the synthetic grass unit 20 not only helps facilitate water drainage but also is effective when the synthetic grass units 20 are used as advertisement or lettering function units because they are interlocked in position.

Figure 9:
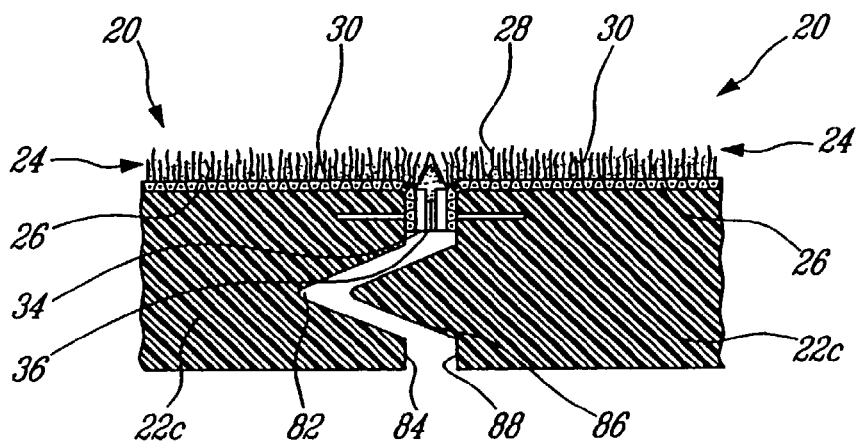
FIG. 9 is a partial side view of a modular synthetic grass turf assembly according to an embodiment of the invention, showing an interlocking structure between adjacent units.

The use of the alignment structures described above, however, is limited to certain circumstances, such as outdoor stadia. In other circumstances, such as halls and gymnasia having wood floors and other ground surfaces, the installation of the alignment tracks on the ground will damage the finish of ground surfaces, which is not acceptable. Therefore, it is desirable to provide alternative interlocking means without the need to mount tracks or other engagement members to the ground. FIG. 9 illustrates such an embodiment of synthetic grass units 20 having such an interlocking mechanism provided therebetween. The like structures of the units 20 shown in FIG. 9 are indicated by the same numerals as shown in FIG. 1 and are not redundantly described here. The synthetic grass unit 20 has a flexible base sheet 22$c$ having a groove 82 in a "V"-shaped cross-section on one side surface 84 extending longitudinally along the entire length of the side surface 84. At the other side of the base sheet 22$c$, there is a ridge 86 having a corresponding triangular cross-section protruding from the side surface 88 and extending longitudinally along the entire length of the side surface 88. The ridge 86 of the base sheet 22$c$ of one unit 20 is received in the groove 82 of the base sheet 22$c$ of the adjacent unit 20 when these units 20 are laid side by side. A gap is formed between the two side surfaces 84 and 88 because of the thickness of the metal bars 34, screw heads 66, and the strip portion of the sheet backing 26 with the synthetic grass ribbons 28 between the side surfaces 84 and 88. Therefore, the ridge 86 must protrude farther than the groove 82 is recessed. In this particular embodiment, each metal bar 34 is 1/8 inch thick, each screw head 36 is 1/16 inch and the sheet backing 26 combined with the synthetic grass ribbons 28 pressed by the metal bar 34 is about 1/16 inch thick. Therefore, a 1/2 inch gap is formed between the side surfaces 84 and 88. In order to interlock the adjacent sides of the units 20, the ridge 86 must protrude from the side surface 88 more than 1/2 inch. For example, the ridge 86 may protrude 1 1/2 inches and the groove is recessed about 1 inch. The gap of 1/2 inch between the adjacent synthetic grass units 20 is relatively small in contrast to the dimensions of each unit which are 4 feet by 8 feet. After the synthetic grass units 20 are assembled together on a sports field and the top-dressing is done on site, the relatively small gap between adjacent units will be covered by the synthetic grass ribbons 28 and the particulate mixture of the infill layer 30, and, therefore, these small gaps have no practical effect on the continuous synthetic grass surface.

By stapling the grass to the top of the recycled plastic sheet and trimming the grass along the top edge of the plastic sheet, the side edge thickness can be reduced by having only a thin strip of rubber, also stapled to the side of the recycled plastic sheet. This could eliminate the metal strip if the frequency of use of the removable system is such that minor damage over time is not a concern.

Figure 10:
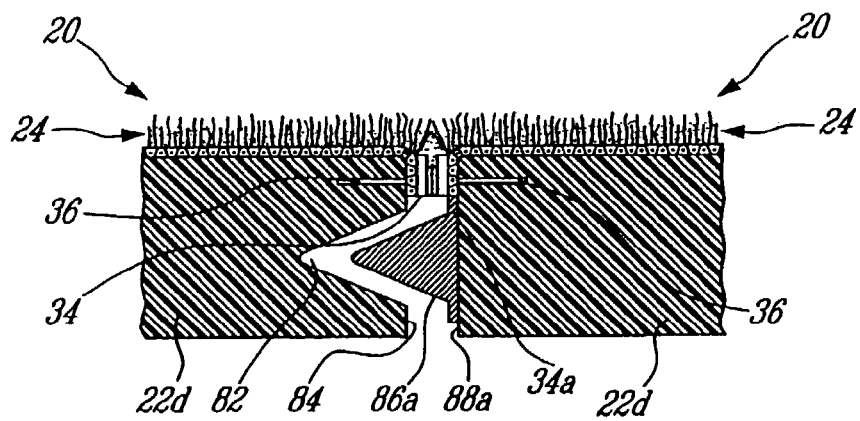
FIG. 10 is a similar view to that illustrated in FIG. 9, showing an alternative interlocking structure between the adjacent units.

FIG. 10 shows an alternative embodiment of the interlocking means of the synthetic grass units 20. The flexible base sheet 22d has a structure at one side similar to that of a base sheet 22c, including the groove 82 in a "V"-shaped cross-section on the side surface 84. However, the other side of the base sheet 22d has a flat side surface 88a that does not include a ridge protruding therefrom like the ridge 86 shown in FIG. 9. A ridge 86a having a triangular cross-section is formed on the metal bar 34a which is much wider than the metal bar 34 used at the one side of the unit 20 to secure the synthetic grass system 24 to the base sheet 22d. The metal bar 34a is twice as wide as the metal bar 34 so that the upper portion of the metal bar 34a includes the mounting bores to perform the same securing function as the metal bar 34 does, while a lower portion of the metal bar 34a performs the same interlocking function as the ridge 86 of the base sheet 22c. The ridge 86a that extends longitudinally along the entire length of the metal bar 34a may be replaced by a plurality of metal pins protruding from the metal bar 34a and spaced apart from one another while the "V"-shaped groove 82 is replaced by corresponding bores for receiving such metal pins protruding from the metal bar 34a. Nevertheless, the "V"-shaped groove and the triangular cross-sectional ridge on the metal bar 34a are more easily made. The groove 82 can be extruded at the same time as the base sheet 22d is produced, and the ridge 86a can be produced at the same time as the metal bar 34a is manufactured in a stamping process.

Figure 11:
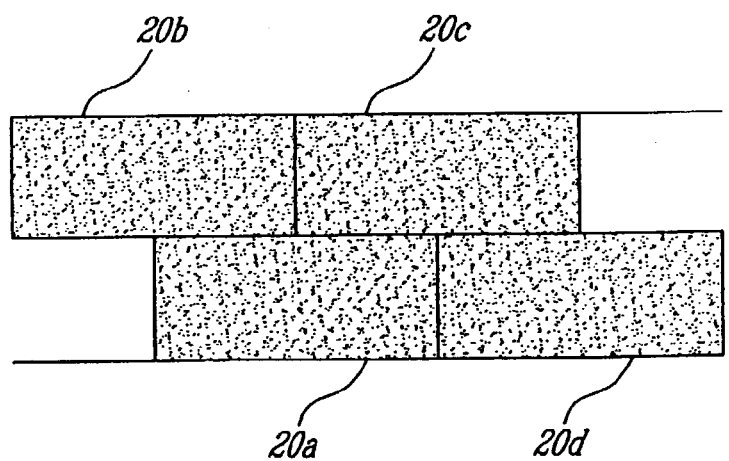
FIG. 11 is a top schematic view showing an arrangement for assembling the synthetic grass units using the interlocking structures illustrated in FIGS. 9 and 10.
Figure 14:
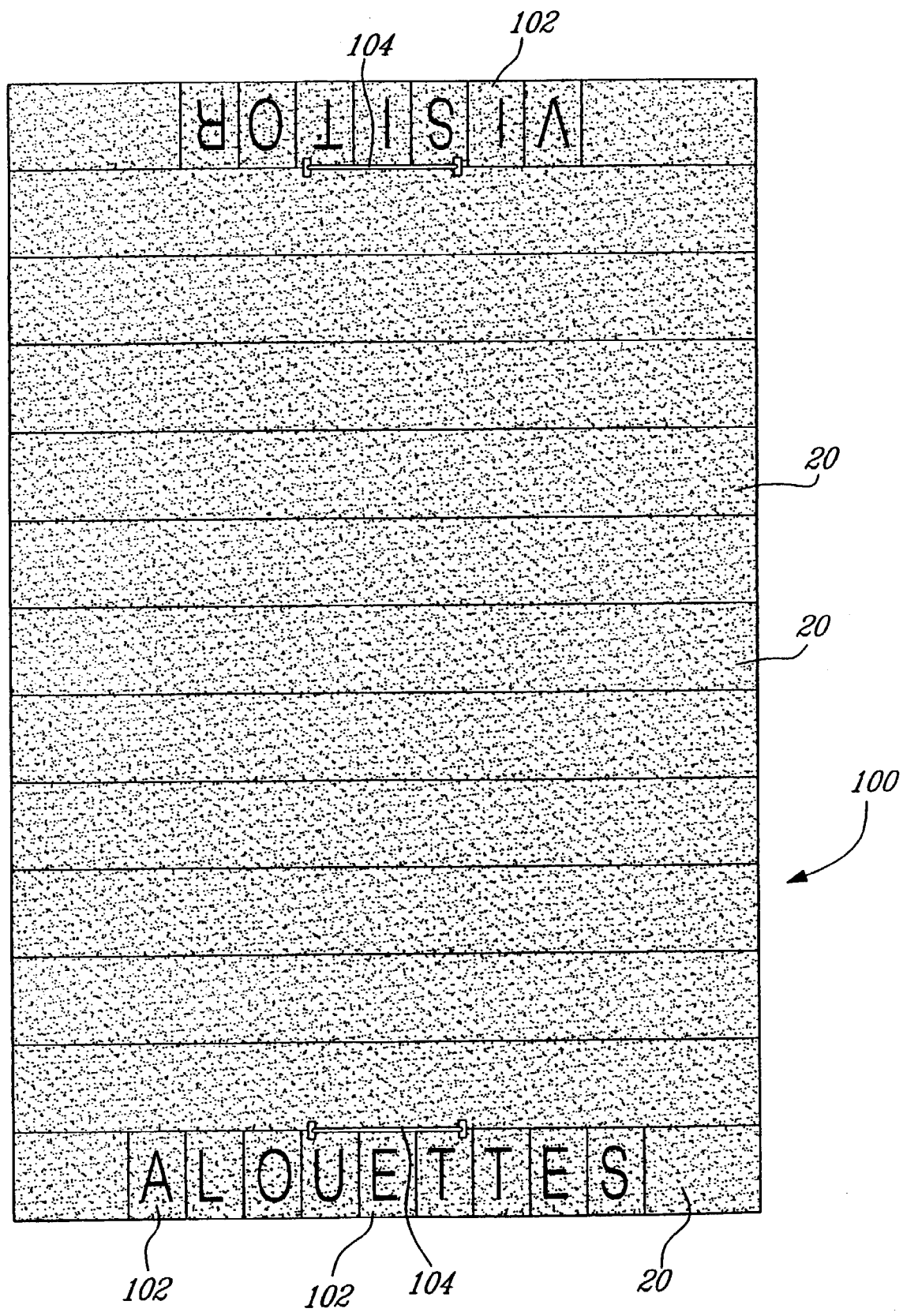
FIG. 14 is a top schematic view showing a football field using a modular synthetic grass turf assembly according to the invention.

The means for interlocking adjacent synthetic grass units illustrated in FIGS. 6-10 only interlock the adjacent units in a same line or in a same column if the units are deployed in an array of lines and columns as illustrated in FIG. 14. In order to interlock the adjacent units into both lines and columns at the same time, the groove 82 and the ridge 86 are needed not only on the respective sides of the base sheet 22c but also the respective ends of the base sheet 22c. If the synthetic grass units 20 are deployed on the ground as illustrated in FIG. 11, each unit 20 needs only one pair of grooves 82 and ridges 86 on the respective sides to interlock all adjacent units which abut its periphery. As shown in FIG. 11, unit 20a is interlocked with units 20b and 20c. The unit 20a does not directly interlock to 20d because there is no interlocking means provided between unit 20a and unit 20d. Nevertheless, unit 20d is interlocked to unit 20c and, therefore, the unit 20a and unit 20d are interlocked through unit 20c to which the unit 20a and unit 20d are commonly locked. The layout of a modular synthetic grass assembly illustrated in FIG. 11, however, is not convenient in some applications, and positioning the units in an array of lines and columns as shown in FIG. 14 is sometimes desirable.

A further embodiment of the interlocking structure is developed for interlocking adjacent units into both lines and columns at the same time. The modular synthetic grass turf assembly includes a first group of the synthetic grass units 20 having flexible base sheets 22e and a second group of the synthetic grass units 20 having flexible base sheets 22f. Each of the base sheets 22e and 22f is extruded with two parallel channels 90 and 91 extending on the bottom surface through its entire length between the two opposite ends, similar to the alignment channels 56 shown in FIG. 4. In the first group, a first transverse channel 92 is provided on the bottom surface of each base sheet 22e extending inwardly from a first side near the first end and terminating at the first channel 90 which is closer to the first side. A second transverse channel 94 is provided on the bottom surface of the base sheet 22e, extending inwardly from the second side near the second end of the base sheet 22e and terminating at the second channel 91 which is closer to the second side. In the second group, a first transverse channel 92a is provided on the bottom surface of each base sheet 22f, extending inwardly from the first side near the second end of the base sheet 22f, and terminating at the first channel 90. A second transverse channel 94a is provided on the bottom surface of the base sheet 22f, extending inwardly from the second side near the first end of the base sheet 22f, terminating at the second channel 91. Therefore, when two synthetic grass units from the first group and two synthetic grass units from the second group are positioned side by side on the ground as shown in FIG. 12, the transverse channels 94, 94a, 92, 92a and a section of channels 90 and 91 form a continuous channel in a rectangular or square shape on the adjacent corner area of the four units.

Figure 12:
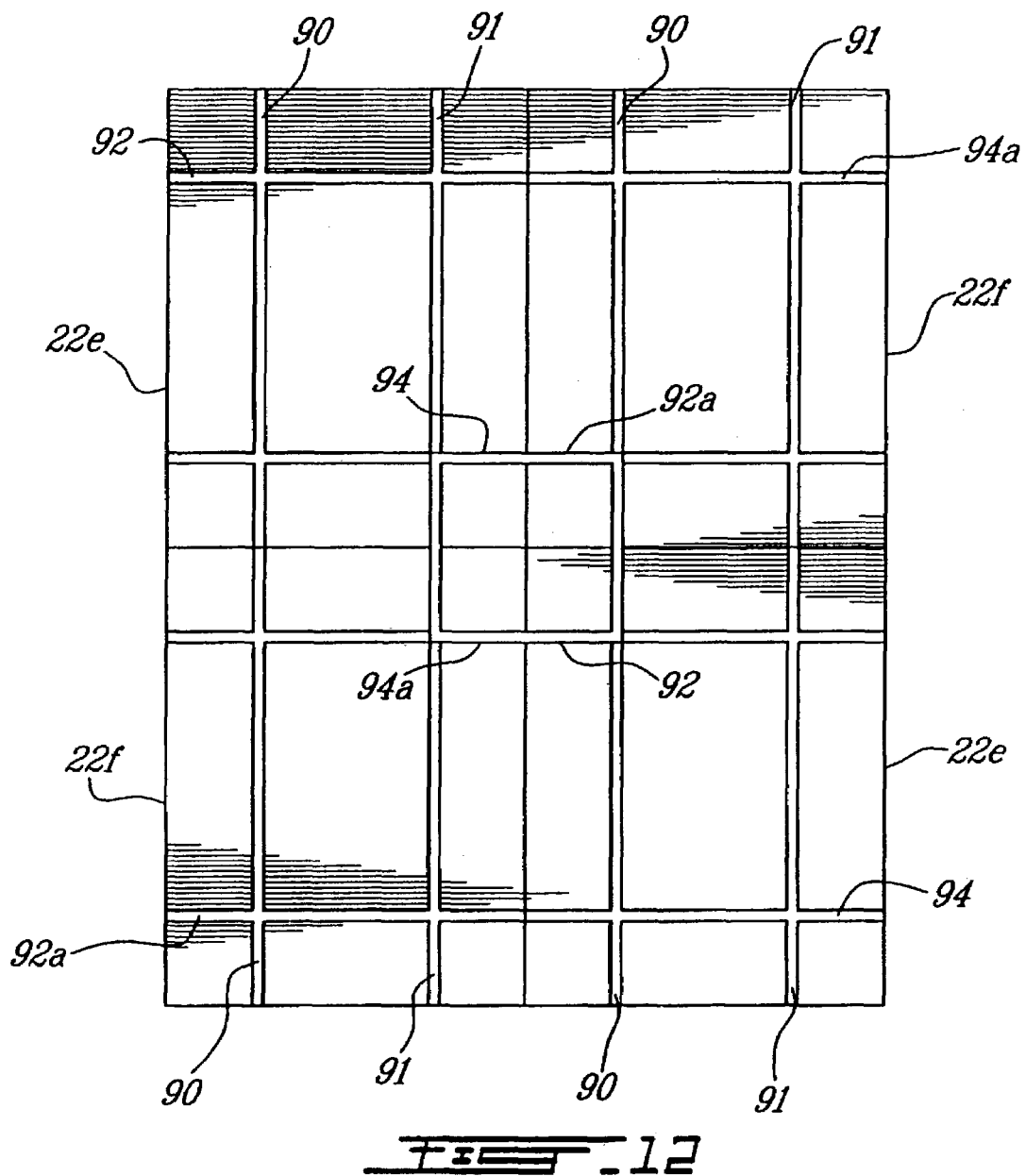
FIG. 12 is a bottom plan view of a modular synthetic grass turf assembly according to another embodiment of the invention, showing the units having an alternative structure for interlocking with one another.
Figure 13:
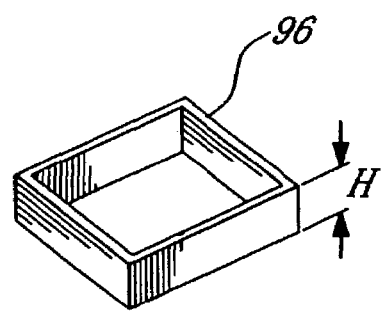
FIG. 13 is a perspective view of a locking ring used to interlock adjacent units as illustrated in FIG. 12.

An aluminum, metal, or hard rubber locking ring 96 is provided, as illustrated in FIG. 13. The locking ring 96 has an identical geometry to the continuous channel formed in the adjacent corner area of the four units shown in FIG. 12. All channels shown in FIG. 12 have an equal width, and the locking ring 96 has a thickness smaller than the channel width so that the locking ring 96 fits in the continuous channel formed in the adjacent corner area of the four units. All channels shown in FIG. 12 are preferably of equal depths, and the locking ring 96 has a height H that is smaller than the depth of the channels to ensure that the four units shown in FIG. 12 are placed flat on the ground when they are interlocked by the interlocking ring 96.

An alternative method of making the transverse channels 92, 92a, 94 and 94a is to extend each of the transverse channels across the entire base sheet (22e or 22f) between the first and second sides as shown in broken lines in FIG. 12, whereby the base sheets 22e are identical to base sheets 22f and there is no need to divide the synthetic grass units 20 into two different groups.

Similarly, such an interlocking ring 96 can be used to connect together the corners of tiles 652, 752, or 852 as depicted in FIGS. 16-19. Particularly, the downwardly protruding legs 654 and 754, as seen in FIGS. 17 and 19 respectively, are easily engaged within the interlocking ring 96, which is configured to fit beneath the tiles and within the channels 653,753 therein, such that the tiles or tile trays can remain flat on the substrate surface while being laterally fastened together.

An example application is illustrated in FIG. 14. A football game playing field is provided using the modular synthetic grass turf assembly 100 according to the invention. The sports field can be prepared with any type of ground selected from stabilized sand, crushed stone, asphalt, concrete, graded and compacted earth, other artificial surfaces and any firm substrate. Synthetic grass turf units 20 generally illustrated in FIG. 1, which may incorporate in part or entirely any embodiments as described above, are prepared individually in a workshop which may be located remotely from the stadium. The synthetic grass turf assembly 100 includes a majority of regular grass units 20 for the green grass surface and a number of synthetic grass units 102 on top of which an individual letter is illustrated in a colour different from the green. However, the units 102 have identical structures to units 20 and are compatible to be laid side by side adjacent to units 20. The individually prepared units 20 and 102 are lifted by a forklift vehicle, such as illustrated in FIGS. 2 and 3, and are stored on standard storage racks. The standard storage racks loaded with the synthetic grass units 20 and 102 are transported to the stadium, and the units 20 and 102 are individually positioned on the prepared ground according to a predetermined layout arrangement. In the application for a football game playing surface as illustrated in FIG. 14, a majority of the area of the surface is formed with the synthetic grass units 20 fit side by side in an array of lines and columns. A number of units 102 for lettering the host name and visitor name are selectively placed in the respective end sections of the field. One or more units presenting a team logo may also be positioned in those sections (not shown). A number of units 20 having advertising marks may be placed on the end sections or side strip sections of the field (not shown). However, each end section beyond the goal gate 104 may include more than one line of units. The football field illustrated in FIG. 14 is only for exemplary purposes. When the modular synthetic grass turf assembly 100 installed in the stadium is to be used for the next game with different teams, the majority of units 20 do not need to be changed, only those units 102 with lettering or marks need to be changed to reflect new team names or logos. For this purpose, a number of lettered or marking units 102 is prepared in the workshop and transported to the site. A forklift vehicle is used to remove those units 102 which are required to be changed from their locations, and position the respective new lettered or marking units 102 in place as required. When the football game playing surface needs to be changed to a baseball game playing surface, it is suggested that the entire modular synthetic grass turf assembly 100 is disassembled, and individual units are loaded on storage racks and transported back to the workshop or a storage facility because the layout of the baseball game playing surface is different from the layout of the football surface. It would not be convenient to make a baseball game playing surface using the same synthetic grass turf assembly for the football game playing surface. Unlike a rectangular football game playing surface, the baseball game playing surface is generally sectorial including a diamond shaped soil ground for positioning the bases. Therefore, a number of unusually shaped synthetic grass units are needed to form such a baseball game playing surface. Those unusually shaped units may be pre-manufactured in the required shapes and individually assembled in the workshop. It is also possible to cut the regular units to form the unusual shapes just like cutting and shaping a wood piece. After preparation in the workshop, all units are transported to the stadium site and assembled in generally the same way as the modular synthetic grass turf assembly 100. It is noted that on site top dressing after the installation of the modular synthetic grass turf assembly is suggested because it improves the even quality of the surface, and the gaps between adjacent units can be well covered by the infill layer of particulate mixture and the synthetic grass.

Another material that can be used is a flexible rubberized fabric such as used on conveyor belts. This material is extremely strong and flexible so that when the grass is installed on this fabric, the end of the fabric could be pulled horizontally towards a flatbed trailer platform in order for the fabric with the grass to slide onto the platform on a horizontal plane. By having a slip-sheet in between the layers of movable panels the next panel to be stored could simply be pulled on top of the previous one thereby eliminating the need for racking material in between the panels. This would substantially reduce the removal and installation time but would also reduce the storage space and thereby storage costs. The edges of the rubberized fabric could have an "L" shaped flexible border affixed around the perimeter of the fabric to hold the infill in the grass.

Figure 15:
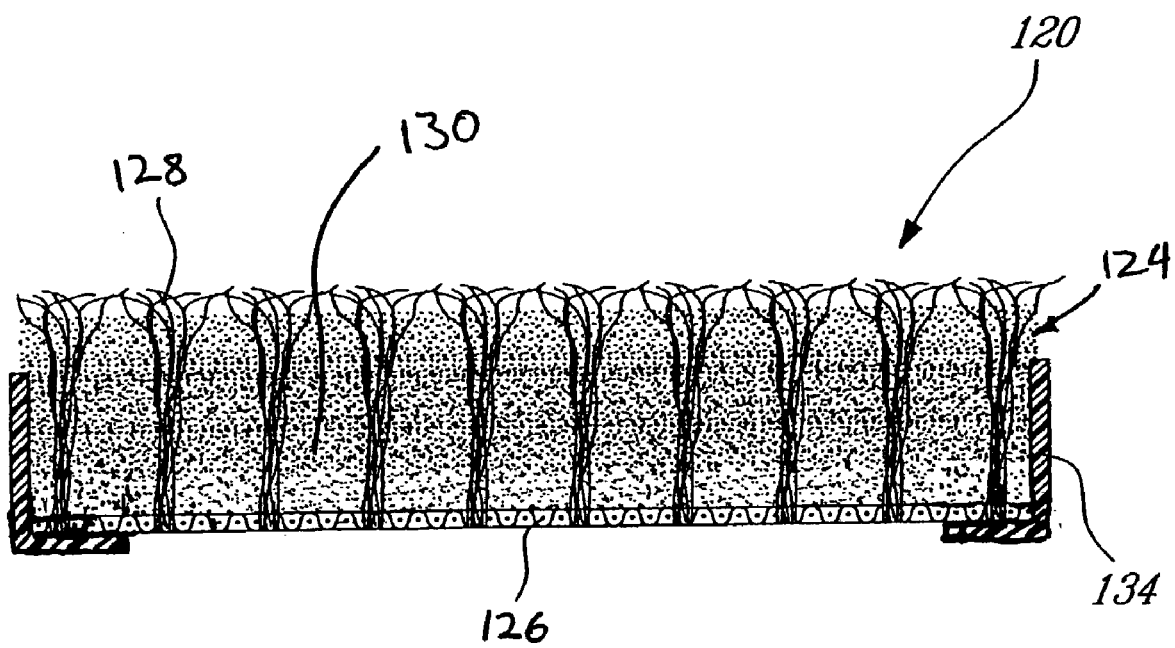
FIG. 15 is a side schematic cross-section of another embodiment of the modular unit.

Alternately, as depicted in FIG. 15, edge borders 134, similarly composed of such "L" shaped flexible borders, are fastenable directly to the edges of the sheet backing 126 of a section of synthetic turf 120, through which the synthetic ribbons 128 upwardly extend. The edge borders 134 therefore act to retain the infill 130 within the confines of the synthetic turf section 120, such that the section can be displaced without first having to completely remove all of the infill therefrom. This embodiment therefore does not require a separate base sheet beneath the backing 126 of the synthetic grass system 124, which has enough inherent stiffness to permit displacement of the modular section. Such "sheet-less" synthetic turf sections 120 can be installed directly on top of the drainage tiles described above, or alternately directly onto a support surface substrate which already provides sufficient drainage.

Velcro systems and or a combination of belting material could be added to the extremities of the fabric in order to affix a removable pulling device for displacement of the large panels.

Another method of having a totally removable surface is to have the infilled grass permanently affixed to the plastic panels of a thickness of between ¼" to 5" in an all green or solid color format without any line markings at all. The lines could then also be permanently affixed to the same plastic material and the line sections could simply be removed with all the infill still in the line and be replaced by the same solid color grass in order to make the field markings disappear entirely without any hint that they ere there at all. By using this format, the field lining system can be completely engineered to be installed at the initial installation and be removable for specific sports in far less time that it takes to remove the entire field surface. This would reduce the wear and tear on the field and make it last longer as well as substantially reduce the storage space needed.

Another method of making removable lines on a prepared asphalt or concrete base is to cut channels out of the base where the lines could be inserted in a manner that would allow removal and replacement of the lines with another color. Pre-designed and planned layout of field lines could be easily incorporated in the base preparation. Some of these line channels could also serve as drainage channels in order to evacuate water faster than standard methods.

To move the flexible rubberized fabric with the grass installed on them they could be pulled horizontally towards a flatbed trailer platform in order for the fabric with the grass to slide onto the platform on a horizontal plane. By having a slip sheet in between the layers of movable rubberized panels the next panel to be stored could simply be pulled on top of the previous one thereby eliminating the need for racking material in between the panels. This would substantially reduce the removal and installation time but would also reduce the storage space and thereby storage costs.

Modifications and improvements to the above described embodiments of the invention may become apparent to those skilled in the art. The foregoing description is intended to be exemplary rather than limiting. The scope of the invention is, therefore, intended to be limited solely by the scope of the appended claims.

The invention claimed is:

1. A unit for a modular synthetic grass turf assembly comprising a base sheet adapted to be flat on a support surface, and a synthetic grass system laid on top of the base sheet and provided in sections sized to fit on the base sheet, said synthetic grass system including at least a sheet backing, a plurality of synthetic ribbons extending upward there from and an infill layer of particulate material disposed interstitially between said synthetic ribbons on said sheet backing, said unit including a flexible edge border upwardly extending therefrom around a perimeter thereof for retaining the infill layer in the unit, said base sheet having at least one drainage aperture extending there through, wherein the base sheet is capable of being fit side by side with respect to a base sheet of another such adjacent unit to provide a substantially flat and substantially continuous synthetic grass surface, wherein the flexible edge border extends substantially equal to or less than the level of the infill layer.

2. The unit as defined in claim 1, wherein said drainage aperture permits water flow through said base sheet in a direction substantially normal to said support surface.

3. The unit as defined in claim 1, wherein said drainage aperture comprises channels formed in said base sheet permitting water flow therethrough in a direction substantially parallel to said support surface.

4. The unit as defined in claim 1, wherein said synthetic grass system is removable from said base sheet.

5. The unit as defined in claim 4, wherein said synthetic grass system is securable to said base sheet.

6. The unit as defined in claim 4, wherein said infill layer retains said synthetic grass system in place on said base sheet.

7. The unit as defined in claim 1, wherein said infill layer retains said unit in place on said support surface.

8. The unit as defined in claim 1, wherein said base sheet comprises connection members on the peripheral edges thereof, said connection members being engageable with corresponding connection members of abutting base sheets of adjacent units, thereby permitting a plurality of units to be interlocked.

9. The unit as defined in claim 1, wherein said base sheet comprises at least one tile having a plurality of drainage apertures therethrough.

10. The unit as defined in claim 1, wherein said edge borders also project outwardly from a perimeter edge of said unit.

11. The unit as defined in claim 1, wherein said edge borders are substantially L-shaped members.

12. The unit as defined in claim 11, wherein said edge borders are fastened to said base sheet.

13. The unit as defined in claim 12, wherein said edge borders are disengageable from said base sheet.

14. The unit as defined in claim 9, wherein said base sheet comprises a plurality of interlockable tiles, said tiles comprising connection members on the peripheral edges thereof, said connection members being engageable with corresponding connection members of abutting tiles.

15. A unit for a modular synthetic grass turf assembly comprising a base sheet adapted to be laid flat on a support surface, and a synthetic grass system laid on top of the base sheet, said synthetic grass system including at least a sheet backing, a plurality of synthetic ribbons extending upward therefrom and an infill layer of particulate material disposed interstitially between said synthetic ribbons on said sheet backing, said unit comprising flexible edge borders upwardly extending therefrom around a perimeter thereof for retaining said infill layer, said base sheet comprising at least one tile having a plurality of drainage apertures therethrough, said base sheet being adapted to abut a similar base sheet of an adjacent such unit to provide a modular synthetic grass turf assembly having a substantially continuous base sheet layer on said support surface and a substantially continuous synthetic grass system superimposed thereon, wherein the flexible edge border extend substantially equal to or less than the level of the infill layer.

16. The unit as defined in claim 15, wherein said edge borders are substantially L-shaped members fastened to said base sheet.

17. The unit as defined in claim 16, wherein said edge borders also project outwardly from a perimeter edge of said drainage tile.

18. The unit as defined in claim 15, wherein said edge borders are disengageable from said base sheet.

19. The unit as defined in claim 15, wherein said drainage apertures permit water to flow transversely down through said tile.

20. The unit as defined in claim 19, wherein said drainage apertures further comprise channels formed in said tile.

21. The unit as defined in claim 20, wherein said channels permit water flow therethrough in a direction of least resistance away from said tile.

22. The unit as defined in claim 15, wherein said infill layer retains said synthetic grass system in place on said base sheet.

23. The unit as defined in claim 15, wherein said tile comprises connection members on the peripheral edges thereof, said connection members being engageable with corresponding connection members of abutting tiles.

24. The unit as defined in claim 23, wherein said base sheet comprises a plurality of tiles, said tiles comprising connection members on the peripheral edges thereof.

25. A method for providing a synthetic grass surface using modular synthetic grass units of a modular synthetic grass turf assembly comprising a base sheet adapted to be laid on a support surface, and a synthetic grass system laid on top of the base sheet and provided in sections sized to fit on the base sheet, said synthetic grass system including at least a sheet backing, a plurality of synthetic ribbons extending upward there from and an infill layer of particulate material disposed interstitially between said synthetic ribbons on said sheet backing, said unit including a flexible edge border upwardly extending there from around a perimeter thereof for retaining the infill layer in the unit, said base sheet having at least one drainage aperture extending there through, wherein the base sheet is capable of being fit side by side with respect to a base sheet of another such adjacent unit to provide a substantially flat and substantially continuous synthetic grass surface, wherein the flexible edge border extends substantially equal to or less than the level of the infill layer, the method comprising steps of: a) preparing a substantially flat surface for supporting the synthetic grass activity surface in a first location; b) transporting from a second location a plurality of synthetic grass units to the first location; each of the units including a flexible base sheet, a synthetic grass system placed on top of the base sheet and edge borders extending around a perimeter of the unit for retaining thereon an infill layer of particulate material of the synthetic grass system; and c) placing the units on the supporting surface according to a predetermined layout and fitting the units side by side to provide a substantially flat and substantially continuous synthetic grass surface.

* * * * *